(12) United States Patent
Moreau et al.

(10) Patent No.: US 10,228,081 B2
(45) Date of Patent: Mar. 12, 2019

(54) METHOD OF FORMING A HOSE ASSEMBLY

(71) Applicant: Kongsberg Actuation Systems II, Inc., Suffield, CT (US)

(72) Inventors: Leo Moreau, Broad Brook, CT (US); Michael Paulson, Longmeadow, MA (US); Rich Hahn, Ortonville, MI (US); Arjen Schippers, Enschede (NL)

(73) Assignee: Kongsberg Actuation Systems II, Inc., Suffield, CT (US)

( * ) Notice: Subject to any disclaimer, the term of this patent is extended or adjusted under 35 U.S.C. 154(b) by 562 days.

(21) Appl. No.: 14/443,242

(22) PCT Filed: Nov. 15, 2013

(86) PCT No.: PCT/US2013/070317
§ 371 (c)(1),
(2) Date: May 15, 2015

(87) PCT Pub. No.: WO2014/078661
PCT Pub. Date: May 22, 2014

(65) Prior Publication Data
US 2015/0300537 A1 Oct. 22, 2015

Related U.S. Application Data

(60) Provisional application No. 61/727,490, filed on Nov. 16, 2012.

(51) Int. Cl.
*B29D 23/00* (2006.01)
*B32B 37/04* (2006.01)
(Continued)

(52) U.S. Cl.
CPC ............ *F16L 11/08* (2013.01); *B29D 23/001* (2013.01); *B32B 37/04* (2013.01); *B32B 37/24* (2013.01);
(Continued)

(58) Field of Classification Search
CPC ........ F16L 11/08; F16L 11/085; F16L 11/081; F16L 11/082; F16L 11/083; F16L 11/086;
(Continued)

(56) References Cited

U.S. PATENT DOCUMENTS 3,620,875 A * 11/1971 Guglielmo, Sr. ... B29C 65/1425
156/272.4
3,633,629 A * 1/1972 Rider ...................... B29C 53/66
138/127

(Continued)

FOREIGN PATENT DOCUMENTS

CA 2025134 A1 7/1991
CN 102702542 A 10/2012
(Continued)

OTHER PUBLICATIONS

International Search Report for Application No. PCT/US2013/070317 dated Feb. 21, 2014, 3 pages.
(Continued)

Primary Examiner — Jeffrey M Wollschlager
(74) Attorney, Agent, or Firm — Howard & Howard Attorneys PLLC

(57) ABSTRACT

A method of forming a hose assembly is disclosed. The hose assembly comprises a tube formed from a polymeric material and defining an outer peripheral surface, and a reinforcing layer disposed about the outer peripheral surface of the tube. The reinforcing layer comprises reinforcing fibers and a binder formed from binding fibers. The method includes the steps of extruding the tube, forming a commingled braid from the reinforcing fibers and the binding fibers, and disposing the commingled braid about the outer peripheral surface of the tube to form a reinforced tube. The method also includes the steps of heating the reinforced tube to a temperature ($T_1$) equal to or greater than a peak melting temperature of the binding fibers to at least partially melt the
(Continued)

binding fibers, and cooling the reinforced tube to solidify the melted binding fibers and form the hose assembly.

14 Claims, 18 Drawing Sheets

(51) Int. Cl.
| | |
|---|---|
| *B32B 37/24* | (2006.01) |
| *F16L 11/08* | (2006.01) |
| *B29K 105/08* | (2006.01) |
| *B29K 105/24* | (2006.01) |
| *B29K 277/00* | (2006.01) |

(52) U.S. Cl.
CPC ..... *F16L 11/085* (2013.01); *B29K 2105/0827* (2013.01); *B29K 2105/24* (2013.01); *B29K 2277/00* (2013.01); *B32B 2037/243* (2013.01); *B32B 2597/00* (2013.01)

(58) Field of Classification Search
CPC ...... F16L 11/087; F16L 11/088; F16L 11/112; B32B 37/24; B32B 37/04; B32B 2597/00; B32B 2037/243; B29D 23/001; B29K 2277/00; B29K 2105/24; B29K 2105/0827

See application file for complete search history.

(56) References Cited

U.S. PATENT DOCUMENTS

| | | | |
|---|---|---|---|
| 3,722,550 A | 3/1973 | Matthews | |
| 4,000,760 A * | 1/1977 | Heller, Jr. | B29D 23/001 138/141 |
| 4,196,464 A | 4/1980 | Russell | |
| 4,259,991 A | 4/1981 | Kutnyak | |
| 4,276,908 A | 7/1981 | Horne | |
| 4,341,578 A * | 7/1982 | Chermak | B29C 47/023 156/149 |
| 4,444,816 A | 4/1984 | Richards et al. | |
| 4,559,782 A | 12/1985 | Ritchey et al. | |
| 4,694,622 A | 9/1987 | Richard | |
| 4,952,262 A * | 8/1990 | Washkewicz | B29C 47/0016 138/125 |
| 5,062,456 A | 11/1991 | Cooke et al. | |
| 5,142,782 A | 9/1992 | Martucci | |
| 5,192,476 A | 3/1993 | Green | |
| 5,381,834 A | 1/1995 | King | |
| 5,383,087 A * | 1/1995 | Noone | B32B 1/08 138/137 |
| 5,613,524 A * | 3/1997 | Martucci | F16L 11/08 138/103 |
| 5,667,499 A * | 9/1997 | Welch | A61M 25/0012 138/125 |
| 5,792,401 A * | 8/1998 | Burnham | A61M 25/0012 264/103 |
| 6,039,084 A * | 3/2000 | Martucci | F16L 11/085 138/131 |
| 6,066,377 A | 3/2000 | Tonyali et al. | |
| 6,109,306 A * | 8/2000 | Kleinert | F16L 11/083 138/125 |
| 6,213,995 B1 * | 4/2001 | Steen | A61B 18/14 604/527 |
| 6,302,150 B1 * | 10/2001 | Martucci | B29D 23/001 138/125 |
| 6,399,714 B1 | 6/2002 | Huang et al. | |
| 6,758,245 B2 | 7/2004 | Troschitz et al. | |
| 6,978,805 B2 * | 12/2005 | D'Amico | F16L 11/085 138/125 |
| 7,114,526 B2 | 10/2006 | Takagi et al. | |
| 7,357,968 B2 | 4/2008 | Sausner et al. | |
| 8,048,351 B2 * | 11/2011 | Bentley | B29C 44/22 138/127 |
| 2002/0182961 A1 * | 12/2002 | Clercq | B29C 70/22 442/316 |
| 2003/0129336 A1 * | 7/2003 | Bourgois | D04C 1/02 428/35.7 |
| 2003/0178082 A1 | 9/2003 | Yamaguchi et al. | |
| 2004/0062895 A1 | 4/2004 | Sausner et al. | |
| 2004/0225278 A1 * | 11/2004 | Poole | A61M 25/0009 604/523 |
| 2005/0005989 A1 * | 1/2005 | Roloff | B32B 1/08 138/137 |
| 2006/0030753 A1 * | 2/2006 | Boutillette | A61B 1/00071 600/146 |
| 2006/0151043 A1 * | 7/2006 | Nanney | B32B 1/08 138/125 |
| 2006/0182914 A1 | 8/2006 | Yasumatsu et al. | |
| 2007/0181202 A1 | 8/2007 | Polasky | |
| 2008/0066822 A1 * | 3/2008 | Varkey | F16L 11/081 138/124 |
| 2008/0072984 A1 | 3/2008 | Branch et al. | |
| 2008/0302437 A1 | 12/2008 | Lovett et al. | |
| 2009/0151805 A1 * | 6/2009 | Martino | F16L 11/088 138/125 |
| 2009/0169790 A1 | 7/2009 | Nadeau et al. | |
| 2009/0250133 A1 | 10/2009 | Polasky | |
| 2010/0170632 A1 | 7/2010 | Gautriaud et al. | |
| 2010/0180975 A1 | 7/2010 | Martucci et al. | |
| 2010/0218839 A1 * | 9/2010 | Conley | B29C 44/1285 138/130 |
| 2010/0266789 A1 * | 10/2010 | Conley | B29D 23/001 428/34.1 |
| 2010/0310805 A1 | 12/2010 | Ou et al. | |
| 2011/0036442 A1 | 2/2011 | Hahn et al. | |
| 2012/0058268 A1 | 3/2012 | Martucci et al. | |
| 2016/0245432 A1 * | 8/2016 | Fonfara | B32B 1/08 |

FOREIGN PATENT DOCUMENTS

| | | |
|---|---|---|
| EP | 0172093 A1 | 2/1986 |
| EP | 0439898 A2 | 8/1991 |
| EP | 0629805 A2 | 12/1994 |
| EP | 0934007 | 4/1998 |
| EP | 0855170 A2 | 7/1998 |
| EP | 0806779 B1 | 11/2001 |
| EP | 1314923 A1 | 5/2003 |
| EP | 1196709 B1 | 4/2005 |
| EP | 1979662 | 8/2007 |
| EP | 1857259 A1 | 11/2007 |
| EP | 2072066 A1 | 6/2009 |
| EP | 2244875 | 7/2009 |
| EP | 2445980 | 1/2011 |
| EP | 1991611 B1 | 11/2011 |
| GB | 862505 | 3/1961 |
| GB | 2088397 A | 6/1982 |
| JP | S5912936 A | 1/1984 |
| JP | 2003327634 A | 11/2003 |
| WO | WO 2004/023026 A1 | 3/2004 |
| WO | WO 2009/085997 A1 | 7/2009 |
| WO | WO 2011/005443 A2 | 1/2011 |
| WO | WO 2011/011268 A1 | 1/2011 |
| WO | WO 2011/126840 A1 | 10/2011 |
| WO | WO 2013/165452 A1 | 11/2013 |
| WO | WO 2013/165453 A1 | 11/2013 |
| WO | WO 2014/078680 A1 | 5/2014 |

OTHER PUBLICATIONS

English language abstract and machine-assisted English translation for CN 102702542 extracted from espacenet.com database on Jul. 31, 2015, 14 pages.

English language abstract and machine-assisted English translation for EP 1857259 extracted from espacenet.com database on May 14, 2015, 19 pages.

English language abstract and machine-assisted English translation for JP 2003327634 extracted from espacenet.com database on Jul. 31, 2015, 7 pages.

(56) References Cited

OTHER PUBLICATIONS

English language abstract for JP S5912936 extracted from espacenet.com database on Aug. 27, 2015, 1 page.

* cited by examiner

METHOD OF FORMING A HOSE ASSEMBLY

CROSS REFERENCE TO RELATED APPLICATION

This application is the National Stage of International Patent Application No. PCT/US2013/070317, filed on Nov. 15, 2013, which claims the benefit of U.S. Provisional Patent Application Ser. No. 61/727,490, filed on Nov. 16, 2012, the disclosures of which are hereby incorporated by reference.

FIELD OF THE DISCLOSURE

The present disclosure generally relates to a method of forming a hose assembly for conveying fluids and a method of forming the hose assembly.

BACKGROUND OF THE DISCLOSURE

Hose assemblies for conveying fuel and other corrosive fluids are well known in the art. These types of hose assemblies are exposed to a variety of fluids, such as foods, fuel mixtures, fuel additives, and chemicals in addition to being exposed to extreme pressures, temperatures, and environmental conditions. Further, these hose assemblies are subjected to physical stresses, such as bending, repeated movement, and forces. Accordingly, these hose assemblies should be resistant to chemical and physical degradation.

These types of hose assemblies typically include a hose formed from polymeric material and one or more reinforcing layers. Mono- or multi-layer hoses formed from polymeric materials generally have low tensile strength, which often causes the hose to have low hoop strength. Consequently, the hose can be susceptible to kinking and other problems. As such, reinforcing layers are added to these hose assemblies to provide additional strength, durability, and kink resistance.

However, methods of forming hose assemblies including one or more reinforcing layers are often complex and costly. As each individual reinforcing layer is added, a binding emulsion composition or a tie layer is typically required to bond the individual reinforcing layers together. As such, the method typically includes many complicated steps and precludes use of reinforcing layers without additional applications of the binding emulsion composition or tie layers. Also, the binding emulsion composition or tie layer can fail to facilitate consistent wetting of the hose and the reinforcing layers, which consequently can cause the hose to delaminate from the reinforcing layers, which, in turn, can cause the hose to kink or even tear. Further, hose assemblies including one or more reinforcing layers often exhibit reduced flexibility, bendability, and deformation after exposure to elevated temperatures. As such, there remains an opportunity to develop an efficient and cost-effective method of forming a hose assembly that is resistant to kinking, flexible, bendable, resistant to deformation after thermal conditioning at higher temperatures, and durable, e.g. exhibits cohesive/destructive delamination of the reinforcing layer from the hose.

SUMMARY OF THE DISCLOSURE

A method of forming a hose assembly is disclosed. The hose assembly comprises a tube formed from a polymeric material and defining an outer peripheral surface, and a reinforcing layer disposed about the outer peripheral surface of the tube. The reinforcing layer comprises reinforcing fibers and a binder formed from binding fibers. The method includes the steps of extruding the tube, forming a commingled braid from the reinforcing fibers and the binding fibers, and disposing the commingled braid about the outer peripheral surface of the tube to form a reinforced tube. The method also includes the steps of heating the reinforced tube to a temperature ($T_1$) equal to or greater than a peak melting temperature of the binding fibers to at least partially melt the binding fibers, and cooling the reinforced tube to solidify the melted binding fibers. Upon cooling, the melted binding fibers solidify to form the binder about the reinforcing fibers, thereby forming a reinforced braid and binding the reinforced braid to the outer peripheral surface of the tube to form the reinforcing layer.

The reinforced tube for forming the hose assembly is also disclosed. The reinforced tube comprises the tube formed from a polymeric material and defines the outer peripheral surface, and the commingled braid disposed about the outer peripheral surface of the tube. The commingled braid comprises reinforcing fibers and binding fibers. A softening temperature, a peak melting temperature, or a decomposition temperature of the reinforcing fibers is at least 100° C. greater than a peak melting temperature of the binding fibers. Upon heating, the binding fibers of the commingled braid at least partially melt and upon cooling solidify to form the binder that binds the reinforcing fibers to form the reinforced braid and bind the reinforced braid to the outer peripheral surface of the tube to form the reinforcing layer.

The method of forming the hose assembly and the reinforced tube for forming the hose assembly are efficient and cost-effective. The hose assembly formed with the method and the reinforced tube is resistant to kinking, flexible, bendable, resistant to deformation after thermal conditioning at higher temperatures, and durable, e.g. exhibits cohesive/destructive delamination of the reinforcing layer from the hose.

BRIEF DESCRIPTION OF THE DRAWINGS

Advantages of the present disclosure will be readily appreciated as the same becomes better understood by reference to the following detailed description when considered in connection with the accompanying drawings.

The drawings are illustrative of the invention, and it is to be understood that the drawings are not necessarily to scale and the components within each individual drawing are not necessarily to scale. To this end, the drawings are intended to be descriptive and not limiting in nature. Many modifications and variations of the drawings are possible in light of the teachings below.

DETAILED DESCRIPTION

Figure 1:
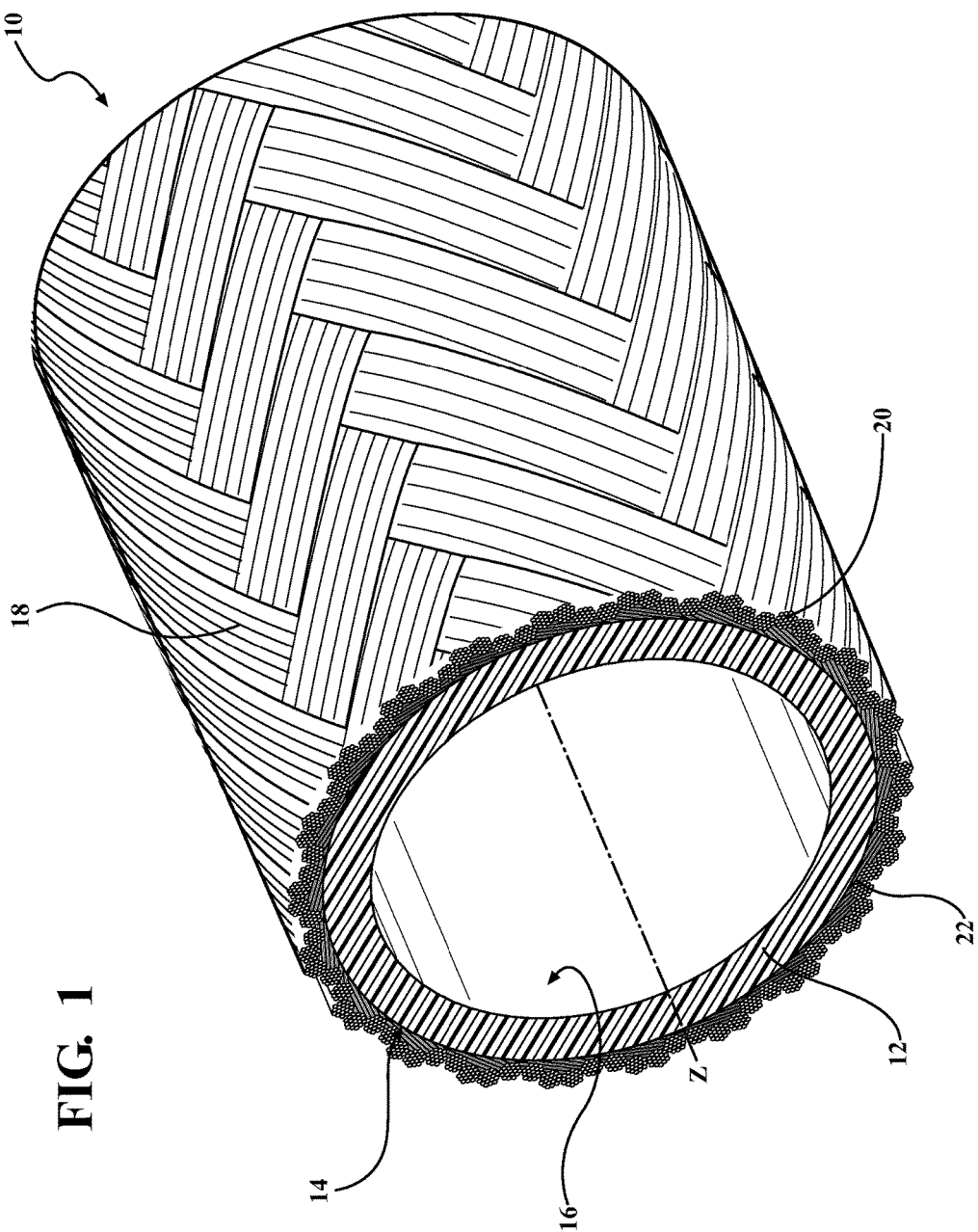
FIG. 1 is a partial cross-sectional perspective view of a hose assembly comprising a tube and a reinforcing layer disposed about an outer peripheral surface of the tube.

Referring to the Figures wherein like numerals indicate like or corresponding parts throughout the several views a hose assembly 10 is generally shown in FIG. 1. As is described in detail below, the hose assembly 10 comprises a tube 12 formed from a polymeric material and defining an outer peripheral surface 14 and an inner peripheral surface 16 opposing the outer peripheral surface 14, and a reinforcing layer 18 disposed about the outer peripheral surface 14 of the tube 12. The reinforcing layer 18 comprises reinforcing fibers 20 and a binder 22 formed from a binding fibers 24.

The hose assembly 10 is typically used for conveying fluids, such as fuels, chemicals, etc. The hose assembly 10 is particularly suitable for use in the transportation industry, e.g. in vehicles; however, it is to be appreciated that the hose assembly 10 is not limited to the transportation industry. For example, the hose assembly 10 can be utilized in the chemical industry, the food industry, and any other suitable industry.

Referring to FIG. 1, the hose assembly 10 includes the tube 12 defining a tubular configuration along an axis Z. The tube 12 is resistant to chemical and thermal degradation. The tube 12 has the inner peripheral surface 16 that is smooth such that minimal turbulence is created as fluid flows therethrough. In addition, the tube 12 has the outer peripheral surface 14 that can be smooth or textured.

The tube 12 is formed from a polymeric material. The tube 12 comprises one or more layers. That is, the tube 12 can be a monolayer tube 12 or a multilayer tube 12. Suitable, non-limiting examples of the polymeric material which can be used to form the one or more layers of the tube 12 include polyethylene, polypropylene, polyvinylchloride, polyethyleneterephtalate (PET), polybutyleneterepthalate (PBT), polyamides, fluoropolymers, or copolymers thereof. Suitable, non-limiting examples of particular fluoropolymers include polytetrafluoroethylene ("PTFE"), Fluorinated Ethylene Propylene ("FEP"), Perfluoroalkoxy ("PFA"), and ethylenetetrafluoroethylene ("ETFE"). Suitable, non-limiting examples of particular polyamides include PA11, PA12, PA610, PA612, PA1010, PA6, PA66, PA1110T, PA1212T, and blends thereof.

Multilayer tubes 12 are advantageous in that the layers can comprise different materials, and thus provide advantages associated with the different materials. For example, the multilayer tube 12 can comprise an inner layer which is thermally stable and an outer layer which softens during formation of the hose assembly 10 so that a reinforcing layer 18 embeds in the outer layer to provided excellent adhesion between the reinforcing layer 18 and the tube 12. As another example, the multilayer tube 12 may include an inner layer comprising fluorocarbon polymer that defines the inner peripheral surface 16 which is resistant to chemical and thermal degradation and an outer layer comprising polyamide that defines the outer peripheral surface 14 which is durable and provides excellent high temperature resistance.

In one embodiment the tube 12 includes three layers (has one intermediate layer between the inner layer and the outer layer). In another embodiment, the multilayer tube 12 includes four layers (has two intermediate layers between the inner layer and the outer layer).

The outer peripheral surface 14 of the tube 12 is defined by the material of the tube 12 (in the case of a single layer tube 12) or the material of the outermost layer of the tube 12 (in the case of a multilayer tube 12). The material of the outer peripheral surface 14 of the tube 12 is typically a semi-crystalline or amorphous thermoplastic polymer. The outer peripheral surface 14 of the tube 12 is typically defined by fluoropolymers and copolymers thereof or polyamides and copolymers thereof. Examples of suitable fluoropolymers include, but are not limited to, PTFE, FEP, PFA, ETFE, and blends thereof. Examples of suitable polyamides include, but are not limited to, PA11, PA12, PA610, PA612, PA1010, PA6, PA66, PA1110T, PA1212T, and blends thereof.

In various embodiments, the tube 12 is electrically conductive. The tube 12 can also include an integral conductor along a length of the tube 12 for preventing build up of electrical charge. As fluid flows through the tube 12, electrical charges tend to build throughout the length of the tube 12. In order to prevent these electrical charges from accumulating, in various embodiments, the tube 12 has the integral conductor which functions as an integral longitudinal conductive means coextensive with the length of the tube 12 for conducting an electrical charge. In one specific embodiment, the integral conductor is a conductive strip of carbon black, e.g. the tube 12 has a conductive strip of carbon black. Carbon black is electrically conductive and will dissipate any electrical charges built up by the fluid. This is done by using carbon black about the tube 12. It should be appreciated that other conductive material may be used to form the integral conductor. In one specific embodiment, the tube 12 is a monolayer tube 12 comprising PTFE formed from a billet comprising an inner material (e.g. conductive PTFE) and an outer material (e.g. non-conductive PTFE) and thus the inner peripheral surface 16 of the monolayer tube 12 is conductive. Alternatively, the entire monolayer tube 12 can comprise the conductive means, e.g. can be formed from conductive PTFE. Alternatively, the tube 12 can comprise a conductive inner layer and a non-conductive outer layer. In most embodiments, the reinforcing layer 18 is not electrically conductive. As such, electrical changes applied to the reinforcing layer 18 will not be conducted throughout the hose assembly 10 or to the fluid passing through the interior of the tube 12.

Still referring to FIG. 1, hose assembly 10 further includes the reinforcing layer 18 for increasing the strength, durability, and bending properties of the hose assembly 10. The reinforcing layer 18 is disposed about outer peripheral surface 14 of the tube 12. The reinforcing layer 18 comprises reinforcing fibers 20 (typically in the form of yarn) that is braided, helically wound, knitted, or wrapped about the tube 12 and the binder 22. The reinforcing layer 18 typically covers greater than 30, alternatively greater than 40, alternatively greater than 50, alternatively greater than 60, alternatively greater than 70, alternatively greater than 80, alternatively greater than 90, alternatively greater than 95, % of the outer peripheral surface 14 of the tube 12. In one embodiment, the reinforcing layer 18 typically covers about 50% of the outer peripheral surface 14 of the tube 12. In another embodiment, the reinforcing layer 18 typically covers about 100% of the outer peripheral surface 14 of the tube 12.

In a typical embodiment, the binder 22 binds (1) the reinforcing fibers 20 within the reinforcing yarn together, (2) the strands of reinforcing yarn together, and (3) the strands of reinforcing yarn to the outer peripheral surface 14 of the tube 12. The binder 22 is formed from the binding fibers 24. More specifically, the reinforcing layer 18 is formed from a commingled braid 26 comprising the reinforcing fibers 20 and the binding fibers 24.

The commingled braid 26 can comprise one or more different types of reinforcing fibers 20. The reinforcing fibers 20 are typically in the form of monofilament, multifilament, or staple yarn (reinforcing yarn). The reinforcing yarn can comprise one or more types of reinforcing fibers 20. The reinforcing fibers 20 typically comprise a polymer, a ceramic, a fiberglass, a metal, or combinations thereof. In one embodiment, the reinforcing fibers 20 comprise fiberglass. Examples of suitable glass reinforcing fibers 20 include, but are not limited to, E-glass (alumina-calcium-borosilicate), S2 glass (magnesium-alumino-silicate), C glass (calcium borosilicate), R glass (calcium-alumino-silicate), silica, quartz, and combinations thereof. Examples of other suitable fibers include, but are not limited to, Basalt fiber, ceramic fiber, aramid fiber (e.g. NOMEX® and KEVLAR® fiber), semi-aromatic aramid fiber, and combinations thereof. Of course, as is set forth above, one or more different types of reinforcing fibers 20 can be used, i.e., blends of any of the reinforcing fibers 20 described herein can be used. In a preferred embodiment, the reinforcing fibers 20 comprise E-glass fiber. Reinforcing fibers 20 comprising fiberglass provide strength to reinforce the tube 12 and are thermally stable at elevated temperatures, which is beneficial for use in high temperature environments, e.g. under the hood of vehicles.

The commingled braid 26 can comprise one or more different types of binding fibers 24. The binding fibers 24 are typically in the form of monofilament strands or multifilament yarn. The binding yarn can comprise one or more types of binding fibers 24. The binding fibers 24 typically comprise one or more polymers selected in consideration of their rheological properties at elevated temperatures as well as their compatibility with (ability to bind the reinforcing layer 18 to the tube 12) the material of the outer peripheral surface 14 of the tube 12. In one embodiment, the binding fibers 24 typically comprise a polymer which has a peak melting temperature that is close to (e.g. within 20° C. of) a peak melting temperature of the material of the outer peripheral surface 14 of the tube 12, and which is also compatible with the material of the outer peripheral surface 14 of the tube 12. The binding fibers 24 typically comprise a semi-crystalline or amorphous polymer.

In one embodiment, the binding fibers 24 comprise a semi-crystalline polymer which is resistant to chemical and thermal degradation. Examples of polymers suitable for the binding fibers 24 include, but are not limited to, polyethylene, polypropylene, polyvinylchloride, PET, PBT, polyamide, fluoropolymer, and copolymers thereof.

In another embodiment, the binding fibers 24 comprise a fluoropolymer. Examples of suitable fluoropolymers include, but are not limited to, PTFE, FEP, PFA, and ETFE. In yet another embodiment, the binding fibers comprise 20 a polyamide. Examples of suitable polyamides include, but are not limited to, PA11, PA12, PA610, PA612, PA1010, PA6, PA66, PA1110T, PA1212T, and blends thereof.

Of course, the commingled braid 26 which is used to form the reinforcing layer 18 can include different types of binding fibers 24. For example, the commingled braid 26 can include binding yarns comprising different binding fibers 24 or having different diameters. To this end, the binding fibers 24 can comprise different types of binding fibers 24. For example, the binding fibers 24 can include binding fibers 24 comprising different polymers or having different diameters.

The form of the reinforcing fibers 20 and the binding fibers 24 can impact the configuration of the commingled braid 26. For example, when one or more strands of monofilament binding fiber 24 are included in the commingled braid 26, a preferred embodiment is to dispose or "wrap" the strands of monofilament binding fiber 24 about the exterior of braided reinforcing fibers 20 to form the commingled braid 26. Commingled braids 26 of this configuration exhibit excellent adhesion to the tube 12. Of course, when one or more strands of monofilament binding fiber 24 are included in the commingled braid 26, the strands of monofilament binding fiber 24 can be braided with the reinforcing fibers 20 to form the commingled braid 26. Commingled braids 26 of this configuration exhibit excellent cohesive strength and excellent adhesion to the tube 12.

In another embodiment, when yarn comprising multifilament binding fibers 24 is included in the commingled braid 26, the yarn comprising multifilament binding fibers 24 can be braided directly with strands of reinforcing fibers 20 or disposed or "wrapped" about the exterior of the braided strands of reinforcing fibers 20. Because the multifilament yarn comprising binding fibers 24 includes binding fibers 24 which is typically smaller in diameter and less densely packed than monofilament strands of binding fiber 24, strands of multifilament binding fibers 24 are believed to melt quickly and provide a robust bond between the reinforcing fibers 20 and the tube 12.

As described above, the binding fibers 24 typically comprise a polymer which is compatible with the material of the outer peripheral surface 14 of the tube 12 such that the binding fibers 24 melt to form a binder 22 that bonds to the tube 12 and the reinforcing fibers 20. Compatibility is typically achieved by bonding similar polymers to one another. For example, binding fibers 24 comprising fluoropolymer are typically compatible with/adheres well to the outer peripheral surface 14 of the tube 12 which is formed from another fluoropolymer. As another example, binding fibers 24 comprising a polyamide are typically compatible with/adheres well to the outer peripheral surface 14 of the tube 12 which is formed from another polyamide. However, the disclosure is not limited to like polymers bonding to each other. For example, binding fibers 24 comprising one type of fluoropolymer, e.g. FEP can be used with a tube 12 having the outer peripheral surface 14 formed with another type of fluoropolymer, e.g. PTFE. As another example, binding fibers 24 comprising a functionally modified fluoropolymer, e.g. functionally modified ETFE can be used with a tube 12 having the outer peripheral surface 14 formed from a polyamide, e.g. PA 6, 12. As yet another example, binding fibers 24 comprising polyamide, e.g. PA 6, 12 can be used with a tube 12 having the outer peripheral surface 14 formed from a functionally modified fluoropolymer, e.g. functionally modified ETFE.

Various embodiments of the commingled braid 26 are discussed below. In various embodiments, the commingled braid 26 comprises from 55 to 95, alternatively from 65 to 85 percent by volume reinforcing fibers 20, and from 5 to 45, alternatively from 15 to 35, percent by volume binding fibers 24. Alternatively, in various embodiments from 1 to 15, alternatively from 1 to 8, reinforcing strands, and from 1 to 6, alternatively from 1 to 3, monofilament binding fibers 24 can be helically wrapped about or within the braided reinforcing fibers 20 to form the commingled braid 26. Specifically, referring now to FIGS. 2-9, various non-limiting embodiments of the commingled braid 26 are shown.

As alluded to above, in one embodiment, the commingled braid 26 comprises a monofilament or multifilament binding fibers 24 helically wrapped about the exterior of braided reinforcing fibers 20. In this embodiment from 1 to 15, alternatively from 1 to 8, reinforcing strands can be braided together, and from 1 to 6, alternatively from 1 to 3, monofilament binding fiber 24 can be helically wrapped about the braided reinforcing fibers 20. In this embodiment, monofilament binding fiber 24 is typically wrapped around the braided reinforcing fibers 20 at a frequency of from 0.1 to 10 twists per inch, alternatively from 0.5 to 3, alternatively from 1 to 2.6, twists per inch. Of course, the frequency of twists will depend on the size of the monofilament binding fiber 24 and the number of strands/ends of the monofilament binding fiber 24 and can vary outside the ranges set forth above.

Figure 2:
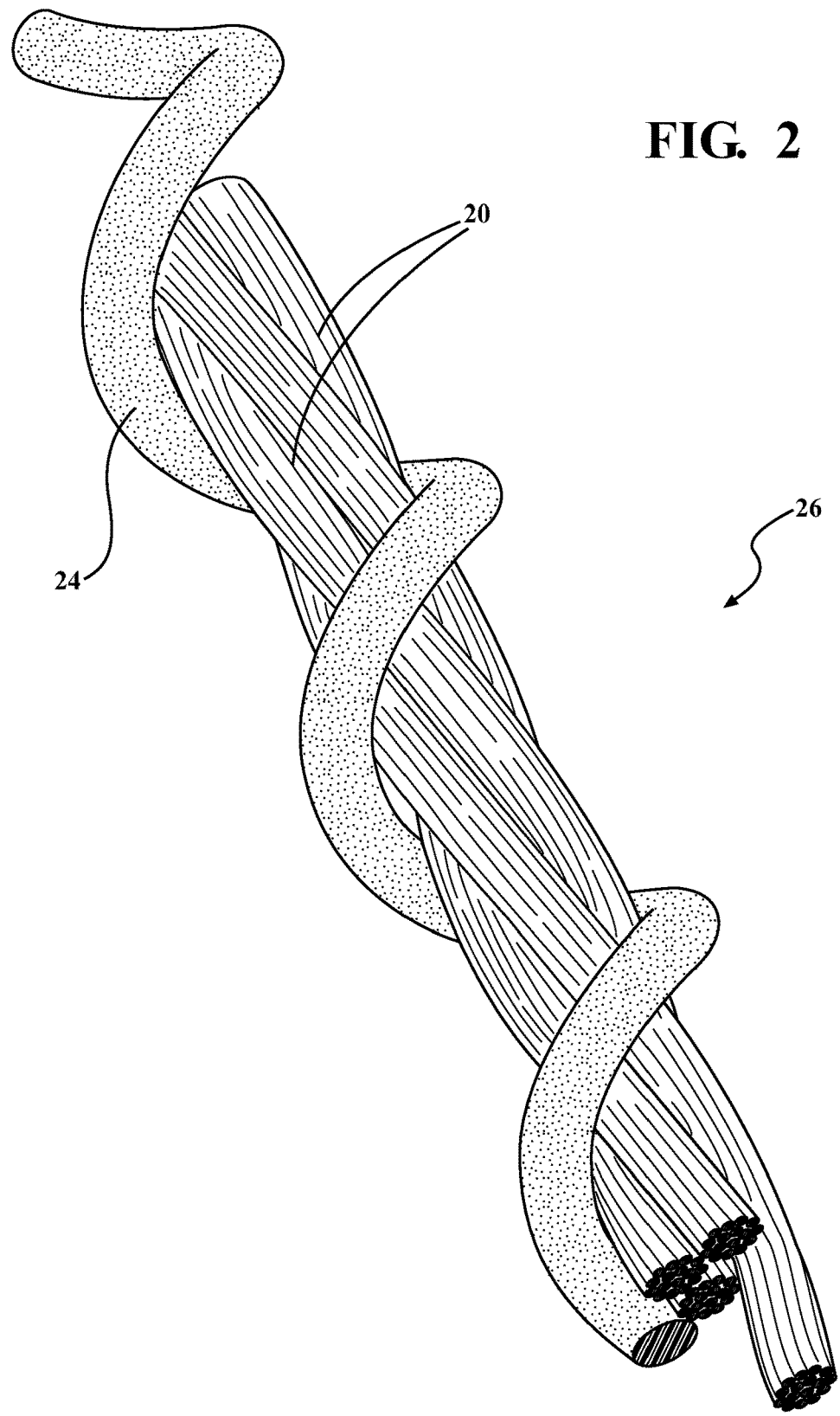
FIG. 2 is a partial cross-sectional perspective view of a commingled braid comprising four braided strands of reinforcing yarn comprising reinforcing fibers, and a single strand of monofilament binding fiber counter-wrapped helically about the four braided strands of reinforcing yarn.

As an example of the embodiment of the commingled braid 26 described immediately above, FIG. 2 is a partial cross-sectional perspective view of a commingled braid 26 comprising four braided strands of reinforcing yarn comprising reinforcing fibers 20, and a single strand of monofilament binding fiber 24 counter-wrapped helically about the four braided strands of reinforcing yarn. Alternatively, the commingled braid 26 of FIG. 2 can be described as a commingled braid 26 comprising four braided reinforcing ends (e.g. glass ends) having a monofilament binding end counter-wrapped helically thereabout.

As another example of the embodiment of the commingled braid 26 described above, FIG. 3 is a partial cross-sectional perspective view of a commingled braid 26 comprising four braided strands of reinforcing yarn comprising reinforcing fibers 20, and two strands of monofilament binding fiber 24 counter-wrapped helically about the four braided strands of reinforcing yarn. Alternatively, the commingled braid 26 of FIG. 3 can be described as a commingled braid 26 comprising four braided reinforcing ends (e.g. glass ends) having two monofilament binding ends counter-wrapped helically thereabout.

As yet another example of the embodiment of the commingled braid 26 described above, FIG. 4 is a partial cross-sectional perspective view of a commingled braid 26 comprising four braided strands of reinforcing yarn comprising reinforcing fibers 20, and two strands of monofilament binding fiber 24 cross-wrapped about the four braided strands of reinforcing yarn. Alternatively, the commingled braid 26 of FIG. 4 can be described as a commingled braid 26 comprising four braided reinforcing ends (e.g. glass ends) having two monofilament binding ends cross-wrapped thereabout.

As still yet another example of the embodiment of the commingled braid 26 described above, FIG. 5 is a partial cross-sectional perspective view of a commingled braid 26 comprising three braided strands of monofilament reinforcing fiber 20, and one strand of monofilament binding fiber 24 counter-wrapped helically about the three braided strands of reinforcing fibers 20. Alternatively, the commingled braid 26 of FIG. 5 can be described as a commingled braid 26 comprising three braided monofilament reinforcing ends (e.g. glass ends) having one monofilament binding ends cross-wrapped thereabout.

As alluded to above, in one embodiment, the commingled braid 26 comprises a monofilament or multifilament binding fibers 24 braided to twisted with monofilament or multifilament reinforcing fibers 20. That is, the commingled braid 26 comprises the reinforcing fibers 20 and the binding fibers 24 braided or twisted together. In this embodiment from 1 to 15, alternatively from 1 to 8, strands of monofilament or multifilament reinforcing fibers 20 can be braided with from 1 to 6, alternatively from 1 to 3, strands of monofilament or multifilament binding fibers 24.

Figure 6:
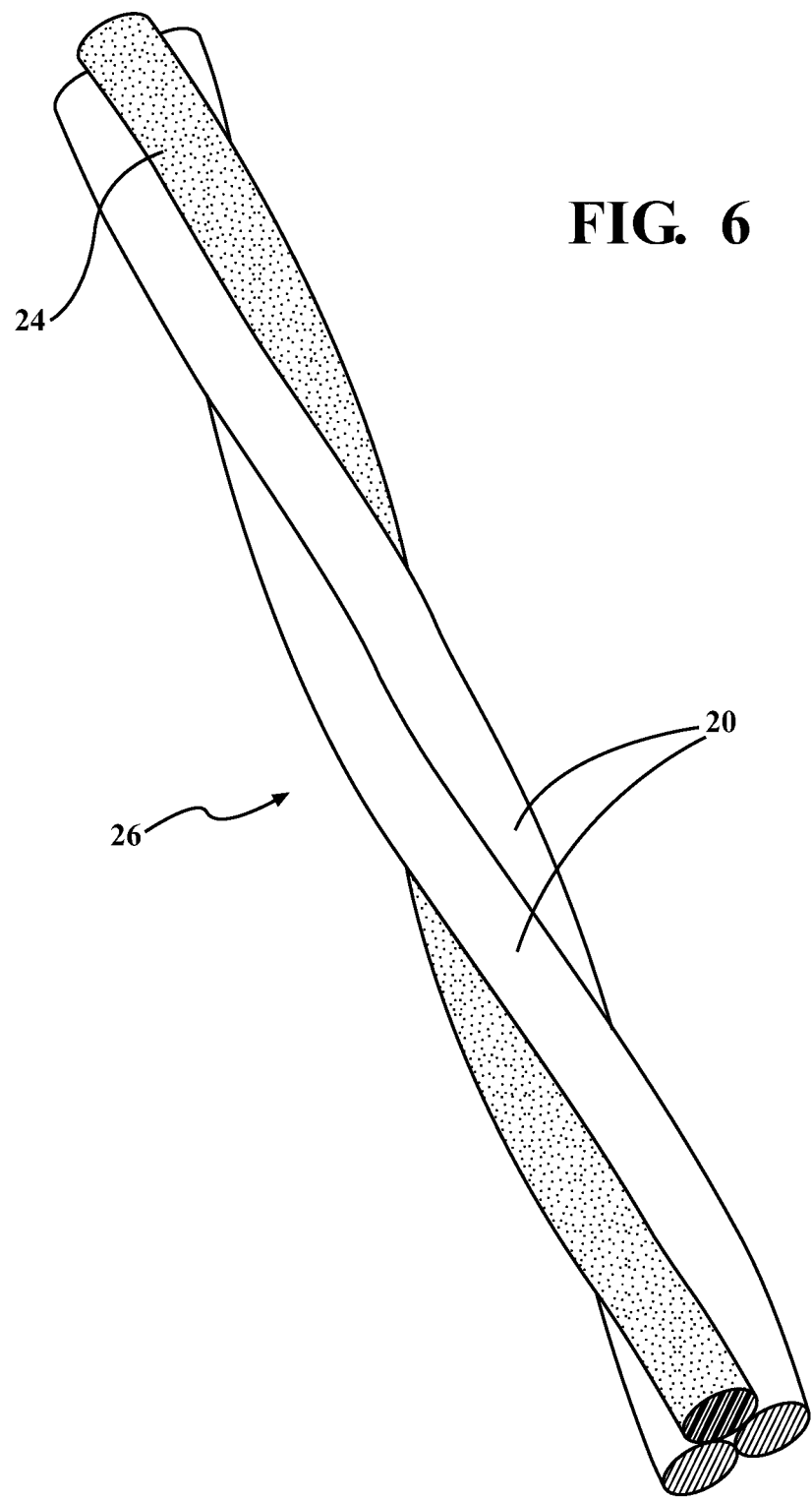
FIG. 6 is a partial cross-sectional perspective view of a commingled braid comprising two strands of monofilament reinforcing fiber braided with one strand of monofilament binding fiber.
Figure 7:
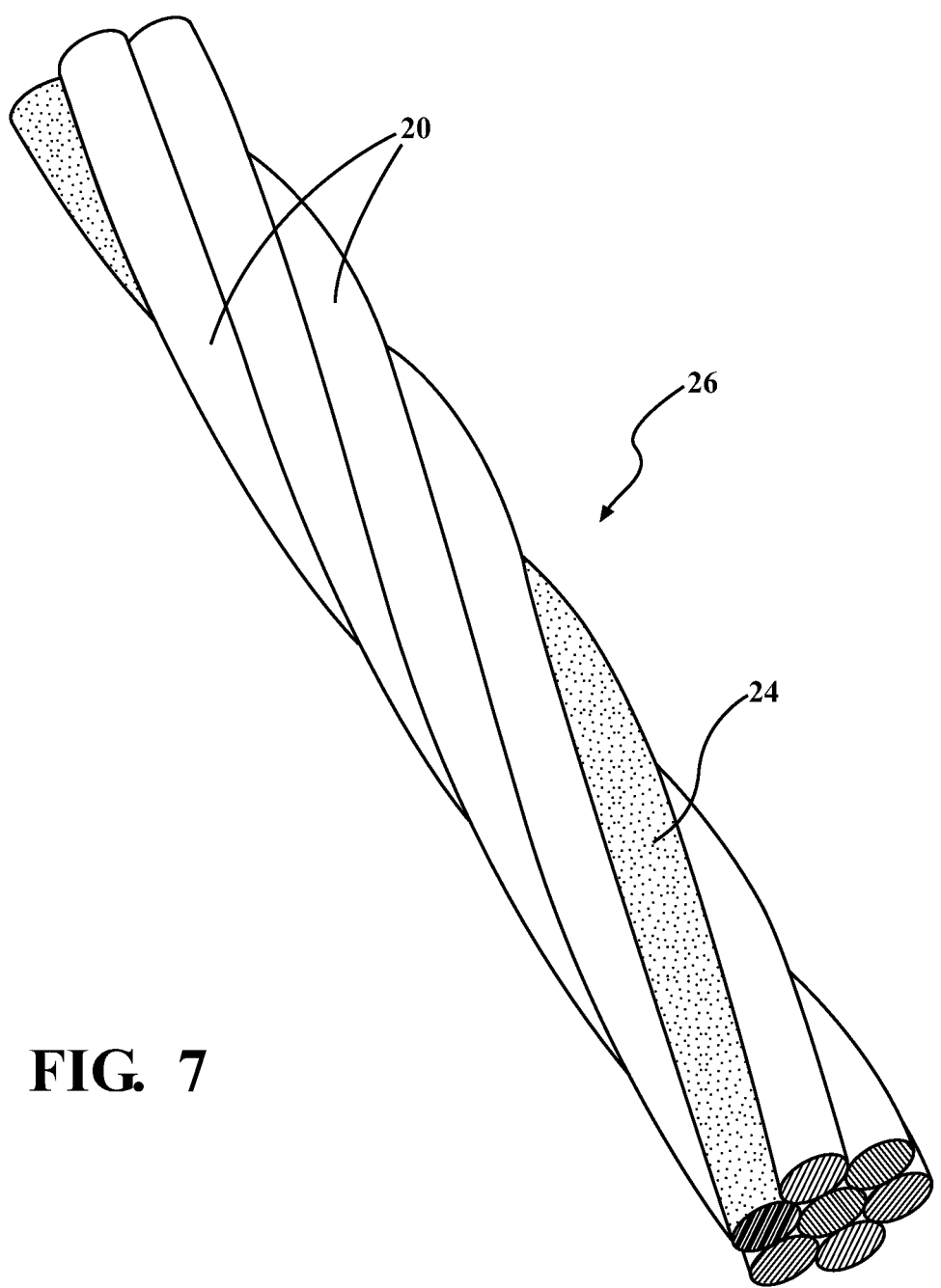
FIG. 7 is a partial cross-sectional perspective view of a commingled braid comprising six strands of monofilament reinforcing fiber braided with one strand of monofilament binding fiber.
Figure 8:
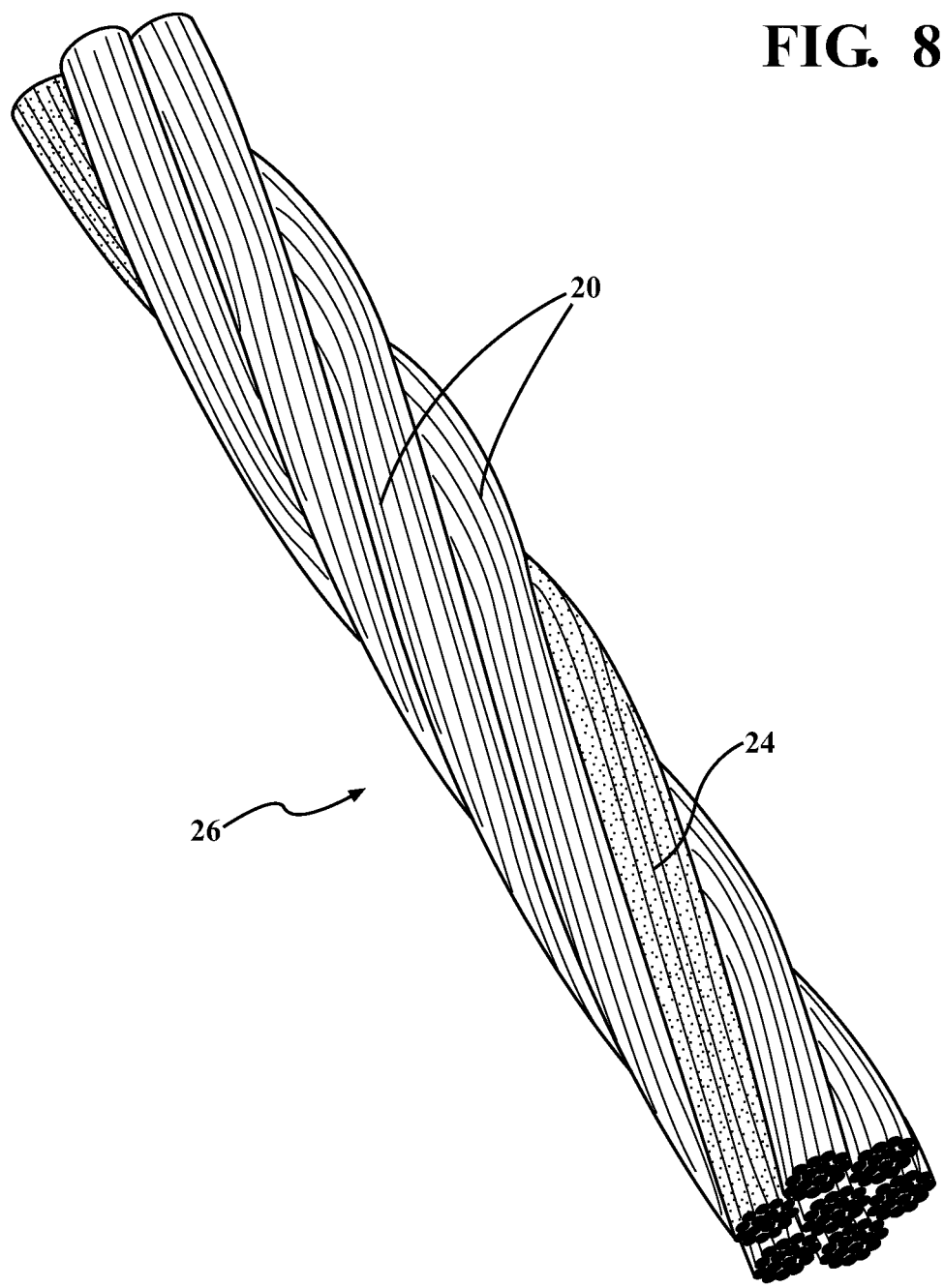
FIG. 8 is a partial cross-sectional perspective view of a commingled braid comprising six strands of multifilament reinforcing fibers braided with one strand of multifilament binding fibers.

As an example of the embodiment of the commingled braid 26 described immediately above, FIG. 6 is a partial cross-sectional perspective view of a commingled braid 26 comprising two strands of monofilament reinforcing fiber 20 braided with one strand of monofilament binding fibers 24. Alternatively, the commingled braid 26 of FIG. 6 can be described as a commingled braid 26 comprising two monofilament reinforcing ends (e.g. glass ends) and one monofilament binding end braided or wrapped together.

In a similar embodiment, the commingled braid 26 comprises two or more pre-braids comprising the reinforcing fibers 20 and the binding fibers 24. In this embodiment, the pre-braids typically comprise two strands (mono or multi-filament) of the reinforcing fibers 20 and one strand (mono or multi-filament) of the binding fibers 24.

As an example of the embodiment of the commingled braid 26 described above, FIG. 7 is a partial cross-sectional perspective view of a commingled braid 26 comprising six strands of monofilament reinforcing fiber 20 braided with one strand of monofilament binding fiber 24. Alternatively, the commingled braid 26 of FIG. 7 can be described as a commingled braid 26 comprising six monofilament reinforcing ends (e.g. glass ends) and one monofilament binding end braided or wrapped together.

As an example of the embodiment of the commingled braid 26 described above, FIG. 8 is a partial cross-sectional perspective view of a commingled braid 26 comprising six strands of multifilament reinforcing fibers 20 braided with one strand of multifilament binding fibers 24. Alternatively, the commingled braid 26 of FIG. 8 can be described as a commingled braid 26 comprising six multifilament reinforcing ends (e.g. glass ends) and one multifilament binding end braided or wrapped together.

The hose assembly 10 can include one or more additional protective layers. The protective layer can comprise a reinforcing layer, a coating layer, and/or a jacket layer. The type and amount of protective layers included in the hose assembly 10 depends on the intended use of the hose assembly 10.

For example, the hose assembly 10 can include additional reinforcing layers. The additional reinforcing layers can be formed from a commingled braid 26 or from various other embodiments know in the art.

Figure 9:
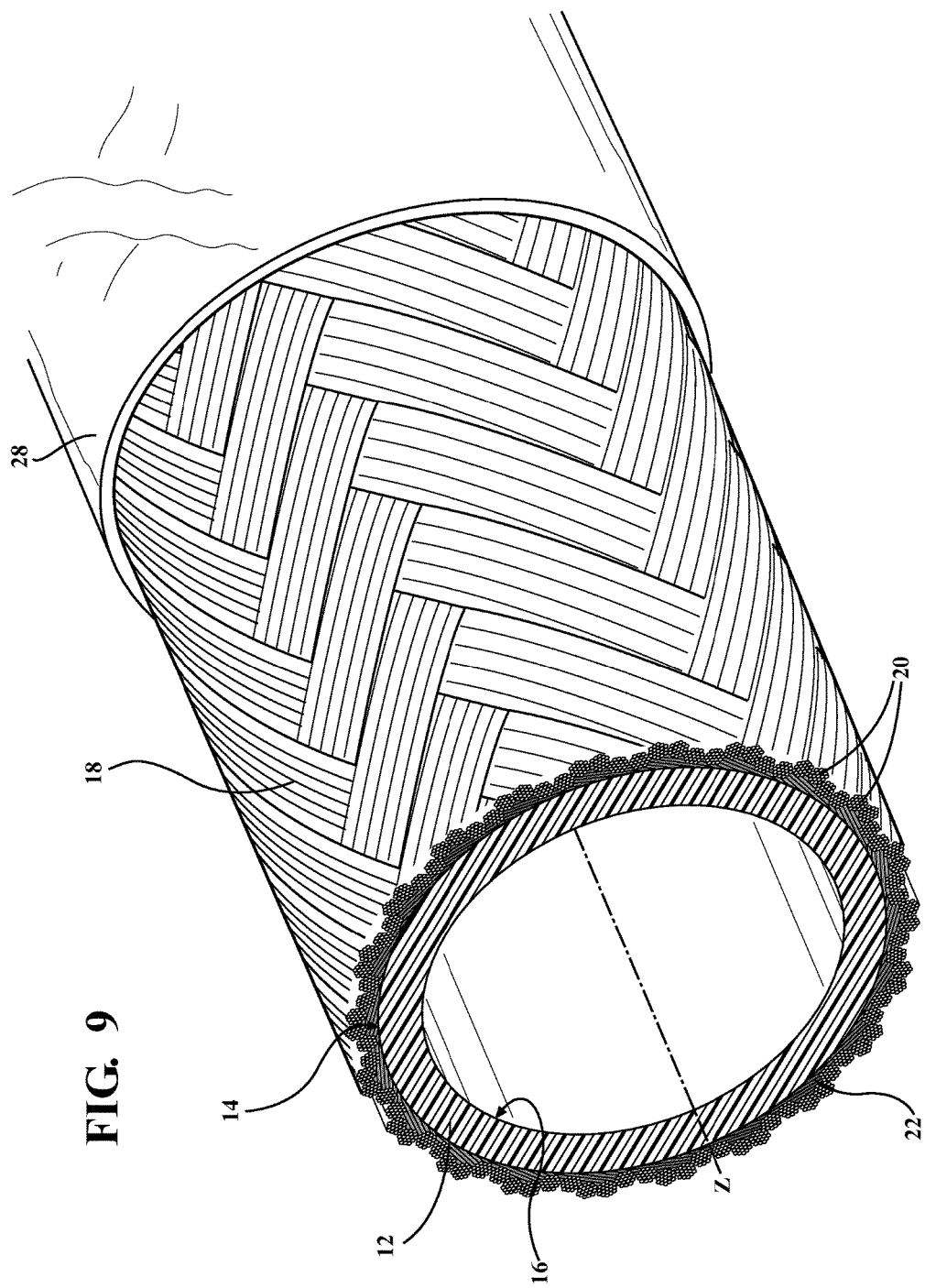
FIG. 9, is a partial cross-sectional perspective view of a hose assembly comprising a tube, a reinforcing layer, and a silicone rubber jacket.

As another example, the hose assembly 10 can include a silicone layer 28 (e.g. a silicone rubber jacket 28). Referring now to FIG. 9, a partial cross-sectional perspective view of the hose assembly 10 comprising the tube 12, the reinforcing layer 18, and the silicone rubber jacket 28 is illustrated.

The silicone rubber jacket 28 of this embodiment comprises a silicone. Of course, the silicone rubber jacket 28 can comprise one or more types of silicone. In one embodiment, the silicone comprises a polyalkylsiloxane such as polydimehtylsiloxane ("PDMS"). In another embodiment, the silicone comprises a silicone having halide functional groups (e.g. a fluoro silicone). In yet another embodiment, the silicone comprises a silicone having phenyl functional groups (e.g. phenyl silicone). The silicone can be room temperature vulcanizing ("RTV") silicone, which cures at room temperature, or high temperature vulcanizing ("HTV") silicone, which cures at temperatures greater than 100° C. In one embodiment, the silicone rubber jacket 28 comprises HTV silicone (either a high consistency rubber ("HCR") or a liquid silicone rubber ("LSR")). In a preferred embodiment, the silicone rubber jacket 28 is formed form HCR silicone which is a one component solid. In contrast, LSR is a two component liquid system. A free radical cure system, such as peroxide, or an addition cure system, such as platinum catalyst, can be used to form a 3-dimensional cross-linked silicone network to provide a durable and temperature resistant silicone rubber jacket 28. In a typical embodiment, a free radical peroxide catalyst is used to cure the silicone. Of course, the silicone which is used to form the silicone rubber jacket 28 can include filler and various other additives as necessary to improve the mechanical, chemical, and physical properties of the silicone rubber jacket 28. For example, a heat stabilizer or rubber modifier can be added to the silicone to improve high temperature stability and compression set performance.

When included in the hose assembly 10, the silicone rubber jacket 28 typically has a Shore A hardness of from 30 and 85, alternatively from 50 to 85. Further, the silicone rubber jacket 28 typically has a thickness of from 0.1 to 4, alternatively from 1.5 to 3.5, alternatively from 2.0 to 3.0, mm. In one specific embodiment, the silicone rubber jacket 28 is formed from HCR silicone and has a thickness of from 1 to 3 mm In another specific embodiment, the silicone rubber jacket 28 is formed from LSR and has a thickness of from 0.33 to 0.50 mm An organopolysiloxane adhesion promoter can be applied to the fibers of the reinforcing layer 18 to improve (1) adhesion of the reinforcing layer 18 to the tube 12, (2) the adhesion of the reinforcing fiber of the reinforcing layer 18 to one another, and/or (3) adhesion of the silicone rubber jacket 28 to the reinforcing layer 18. The adhesion promoter wicks into the commingled braids 26 and wets out the reinforcing fibers 20 thereby binding the reinforcing fibers 20 together. In one embodiment, the adhesion promoter comprises an organopolysiloxane. In this embodiment, a silicone with a high percentage of Si—H groups can be used for cross-linking purposes, i.e., can be used to crosslink the organopolysiloxane. The cross-linker is believed to increase cohesive strength of the adhesion promoter. As thickness of the adhesion promoter increases, the cohesive strength of the adhesion promoter typically decreases. As such, application of a minimal amount of adhesion promoter to the reinforcing fibers 20 of the reinforcing layer 18 is preferred. In one embodiment, the thickness of the adhesion promoter can be minimized by dilution of the adhesion promoter and/or with use of an air knife to remove any excess adhesion promoter.

The hose assembly 10 can further include a coupling (not shown). Typically the coupling is adapted to engage at least one end of the hose assembly 10 for interconnecting the hose assembly 10 to a fluid source, such as fuel tanks. It is to be appreciated that any suitable coupling can be used with the hose assembly 10.

The hose assembly 10 has an inner diameter, an outer diameter, and a length. The inner diameter, the outer diameter, and the length of the hose assembly 10 can also vary depending on the intended use of the hose assembly 10. For example, the hose assembly 10 can have an inner diameter of two inches for use in applications that require transfer of greater volumes of fluid or an inner diameter of a half of an inch for use in applications that require transfer of lesser volumes of fluid.

A method of forming a hose assembly 10 is disclosed. The method includes the steps of extruding the tube 12, forming the commingled braid 26 from the reinforcing fibers 20 and the binding fibers 24, and disposing the commingled braid 26 about the outer peripheral surface 14 of the tube 12 to form a reinforced tube 30. The method also includes the steps of heating the reinforced tube 30 to a temperature ($T_1$) equal to or greater than a peak melting temperature of the binding fibers 24 to at least partially melt the binding fibers 24, and cooling the reinforced tube 30 to solidify the melted binding fibers 24. Upon cooling, the melted binding fibers 24 solidify to form the binder 22 about the reinforcing fibers 20, thereby forming a reinforced braid and binding the reinforced braid to the outer peripheral surface 14 of the tube 12 to form the reinforcing layer 18.

Figure 10A:
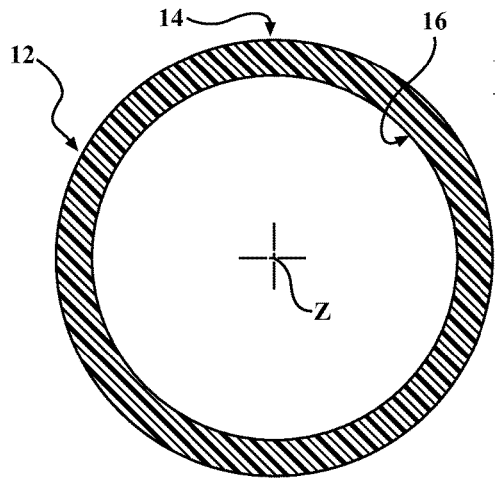
FIG. 10A is a cross-sectional view of a tube after extrusion.
Figure 10B:
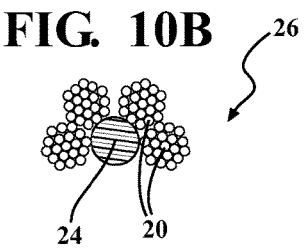
FIG. 10B is a cross-sectional view of a commingled braid comprising reinforcing fibers and binding fibers.

Referring now to FIGS. 10A through 10D, the various steps of the method are illustrated. Specifically, FIG. 10A is a cross-sectional view of the tube 12 after extrusion, FIG.

Figure 10C:
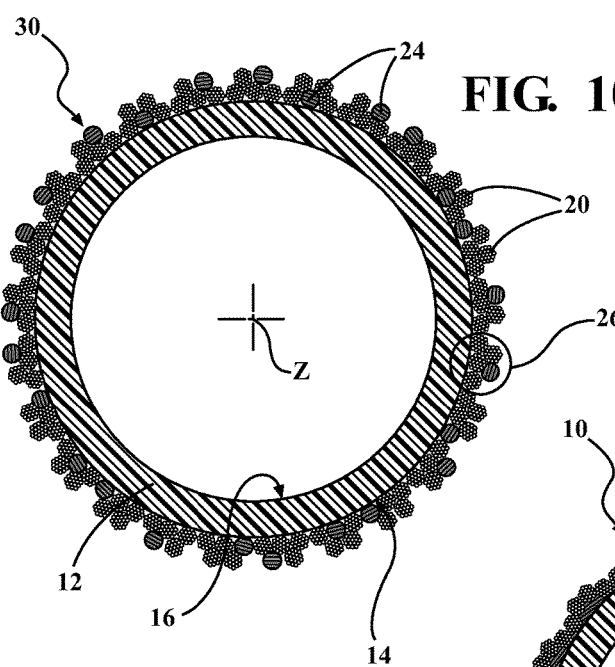
FIG. 10C is a cross-sectional view of a reinforced tube comprising the commingled braid of FIG. 10B disposed about an outer peripheral surface of the tube of FIG. 10A.
Figure 10D:
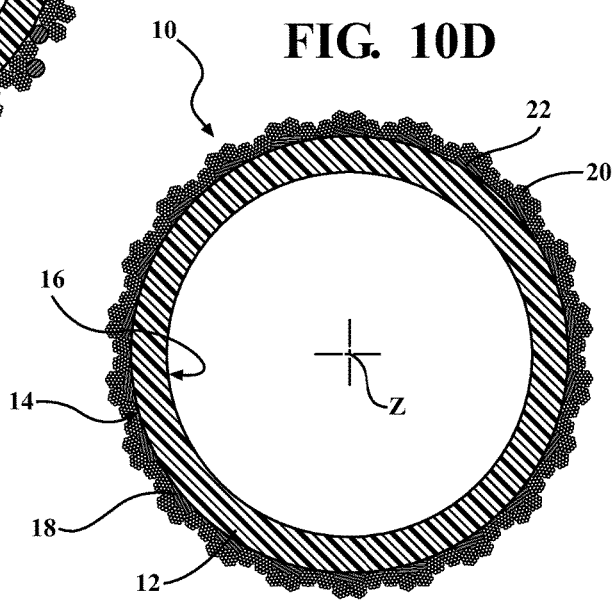
FIG. 10D is a cross-sectional view of a hose assembly formed from the reinforced tube of FIG. 10C.

10B is a cross-sectional view of the commingled braid 26 comprising the reinforcing fibers 20 and the binding fibers 24, FIG. 10C is a cross-sectional view of the reinforced tube 30 comprising the commingled braid 26 disposed about the outer peripheral surface 14 of the tube 12, and FIG. 10D is a cross-sectional view of the hose assembly 10.

As set forth above, the method includes the step of extruding the tube 12. The tube 12 is just as described above. The tube 12 is extruded to the desired dimensions using melt, paste, or any other extrusion technique known in the art. Of course, in various embodiments the tube 12 is a multilayer tube 12 which can be formed with techniques known in the art, such as co-extrusion techniques. In other embodiments, the tube 12 is a monolayer tube 12 formed via a paste extrusion.

As is also set forth above, the method also includes the step of forming the commingled braid 26 from the reinforcing fibers 20 and the binding fibers 24. The commingled braid 26 is just as described above. As is described above, the commingled braid 26 can comprise various configurations of the reinforcing and the binding fibers 24. In one embodiment, the step of forming the commingled braid 26 from the reinforcing fibers 20 and the binding fibers 24 is further defined as braiding the reinforcing fibers 20 and the binding fibers 24 to form the commingled braid 26.

As is also set forth above, the method includes the step of disposing the commingled braid 26 about the outer peripheral surface 14 of the tube 12 to form the reinforced tube 30. The commingled braid 26 is typically disposed about the outer peripheral surface 14 of the tube 12 via braiding, helically winding, knitting, twisting, or wrapping. The tube 12 can be extruded and the commingled braid 26 disposed about the outer peripheral surface 14 of the tube 12 in a single step (in-line) or in two separate steps.

To this end, the reinforced tube 30 for forming the hose assembly 10 comprises the tube 12 formed from polymeric material and defining the outer peripheral surface 14, and the commingled braid 26 disposed about the outer peripheral surface 14 of the tube 12. The commingled braid 26 comprises the reinforcing fibers 20 and the binding fibers 24. The softening temperature, the peak melting temperature, or the decomposition temperature of the reinforcing fibers 20 is typically greater than 100, alternatively greater than 150, alternatively greater than 200, ° C. greater than a peak melting temperature of the binding fibers 24. As such, the binding fibers 24 melt to form the binder 22 when the reinforced tube 30 is heated, and the reinforcing fibers 20 do not melt or soften thereby maintaining their structural integrity.

In one embodiment, the reinforcing fiber comprises glass or ceramic fibers and has a softening temperature of at least 100° C. greater than a peak melting temperature of the binding fibers 24. In another embodiment, the reinforcing fiber comprises aramid fiber and has a decomposition temperature of at least 100° C. greater than a peak melting temperature of the binding fibers 24. In yet another embodiment, the reinforcing fiber comprises polyamide and has a peak melting temperature of at least 100° C. greater than the peak melting of the binding fibers 24.

Figure 11A:
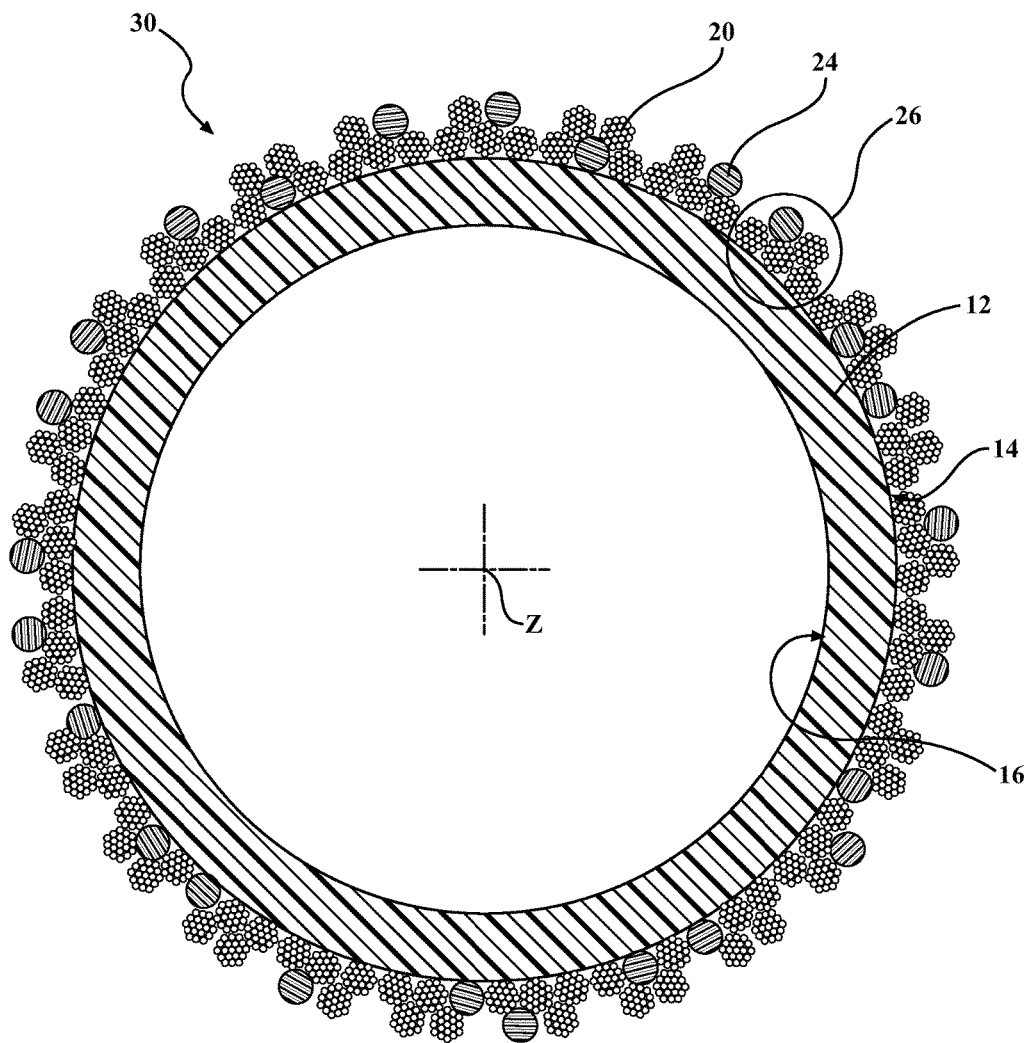
FIG. 11A is an end view of a reinforced tube comprising the commingled braid of FIG. 2 disposed about an outer peripheral surface of a tube.
Figure 11B:
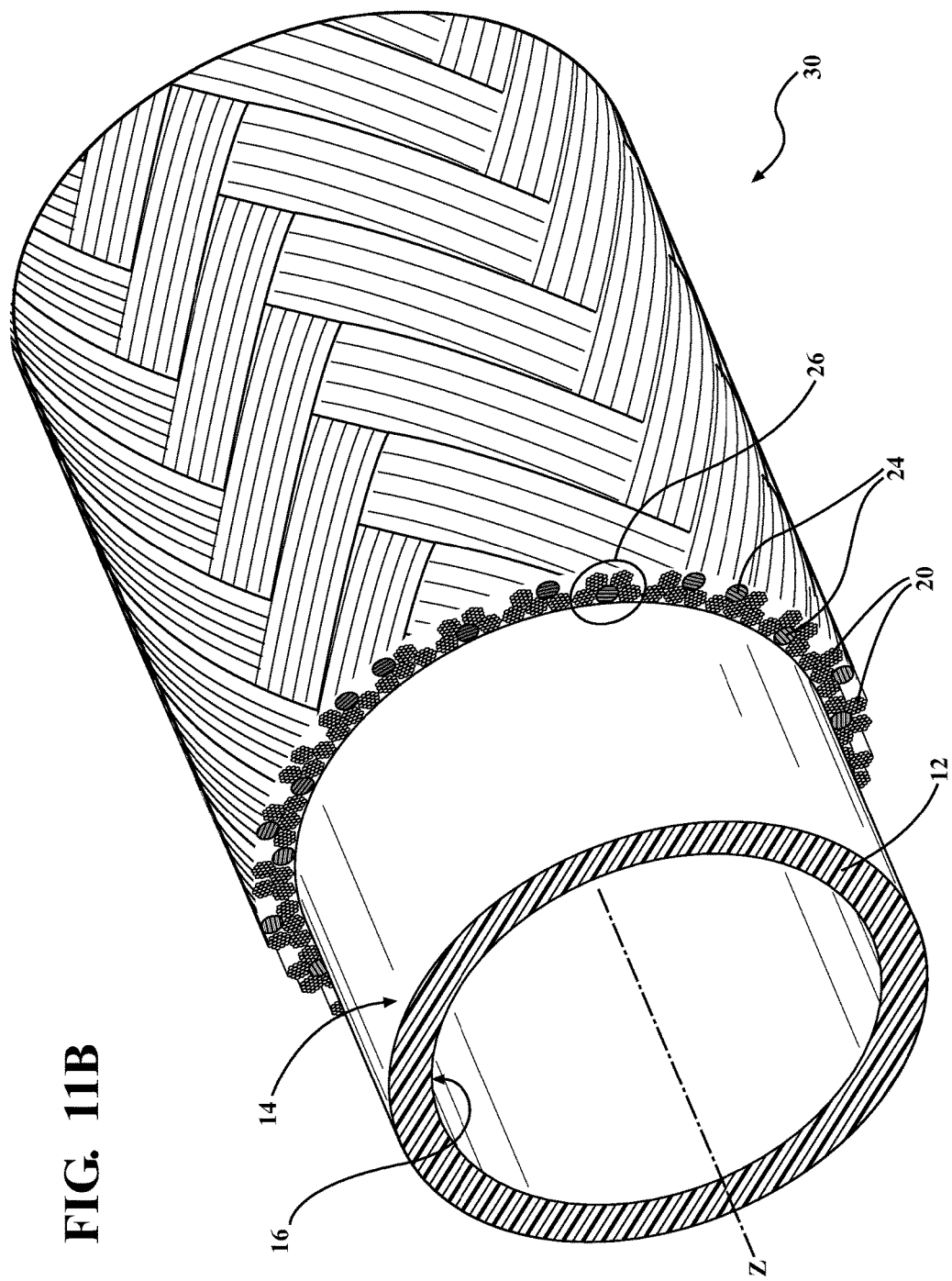
FIG. 11B is a partial cross-sectional perspective view of a reinforced tube comprising the commingled braid of FIG. 2 disposed about an outer peripheral surface of a tube.
Figure 11C:
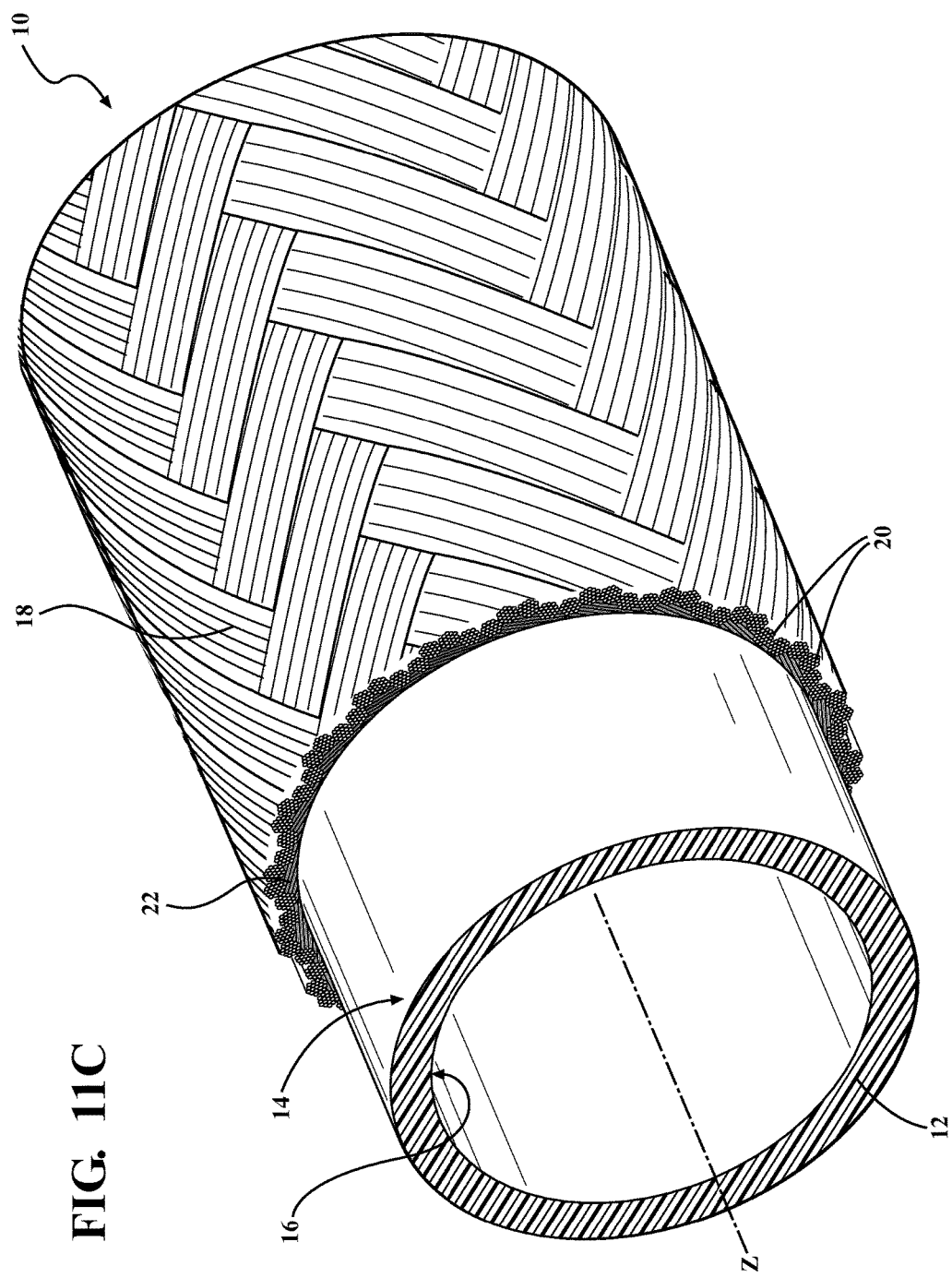
FIG. 11C is a partial cross-sectional perspective view of a hose assembly formed from the reinforced tube of FIGS. 11A and 11B.

Referring now to FIGS. 11A-11C, FIG. 11A is an end view of the reinforced tube 30 comprising the commingled braid 26 of FIG. 2 disposed about the outer peripheral surface 14 of the tube 12. FIG. 11B is a partial cross-sectional perspective view of the reinforced tube 30 comprising the commingled braid 26 of FIG. 2 disposed about the outer peripheral surface 14 of the tube 12. FIGS. 11A and 11B are prior to the steps of heating the reinforced tube 30 to a temperature ($T_1$) equal to or greater than a peak melting temperature of the binding fibers 24 to at least partially melt the binding fibers 24, and cooling the reinforced tube 30 to solidify the melted binding fibers 24 and form the hose assembly 10. FIG. 11C is a partial cross-sectional perspective view of the hose assembly 10 comprising the tube 12 and the reinforcing layer 18 disposed about the outer peripheral surface 14 of the tube 12 which is formed from the reinforced tube 30 of FIGS. 11A and 11B (after the steps of heating and cooling).

Figure 3:
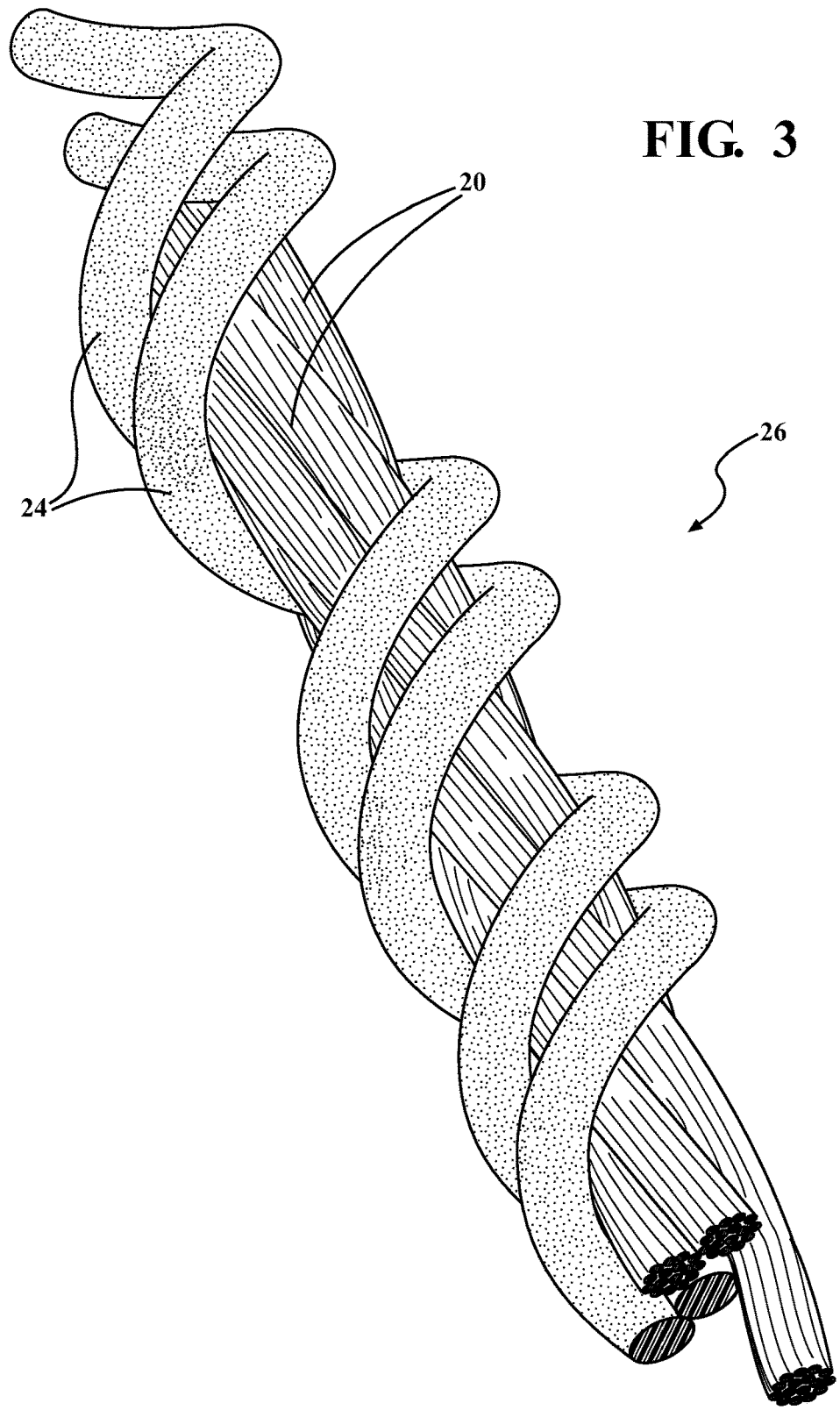
FIG. 3 is a partial cross-sectional perspective view of a commingled braid comprising four braided strands of reinforcing yarn comprising reinforcing fibers, and two strands of monofilament binding fiber counter-wrapped helically about the four braided strands of reinforcing yarn.
Figure 4:
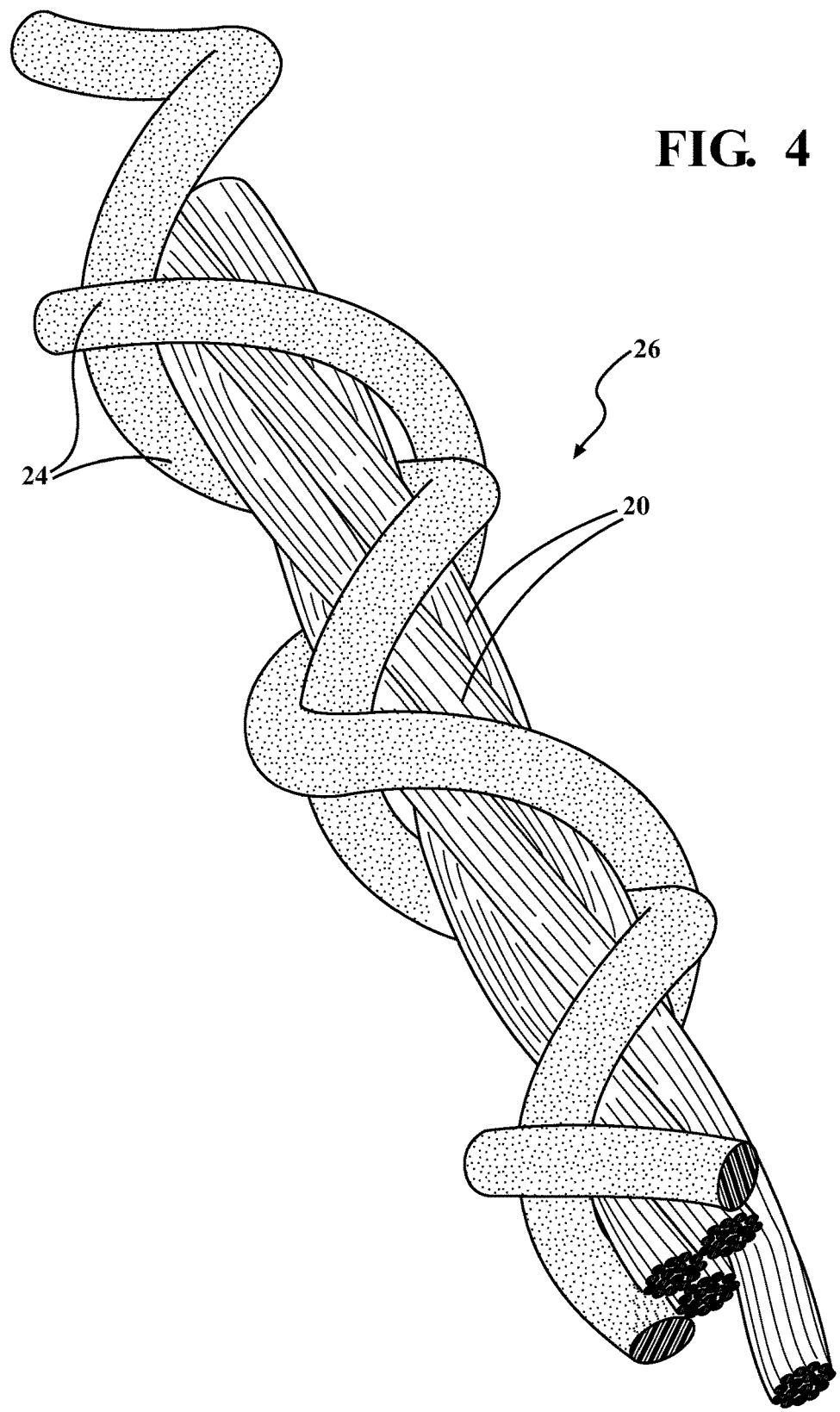
FIG. 4 is a partial cross-sectional perspective view of a commingled braid comprising four braided strands of reinforcing yarn comprising reinforcing fibers, and two strands of monofilament binding fiber cross-wrapped about the four braided strands of reinforcing yarn.
Figure 5:
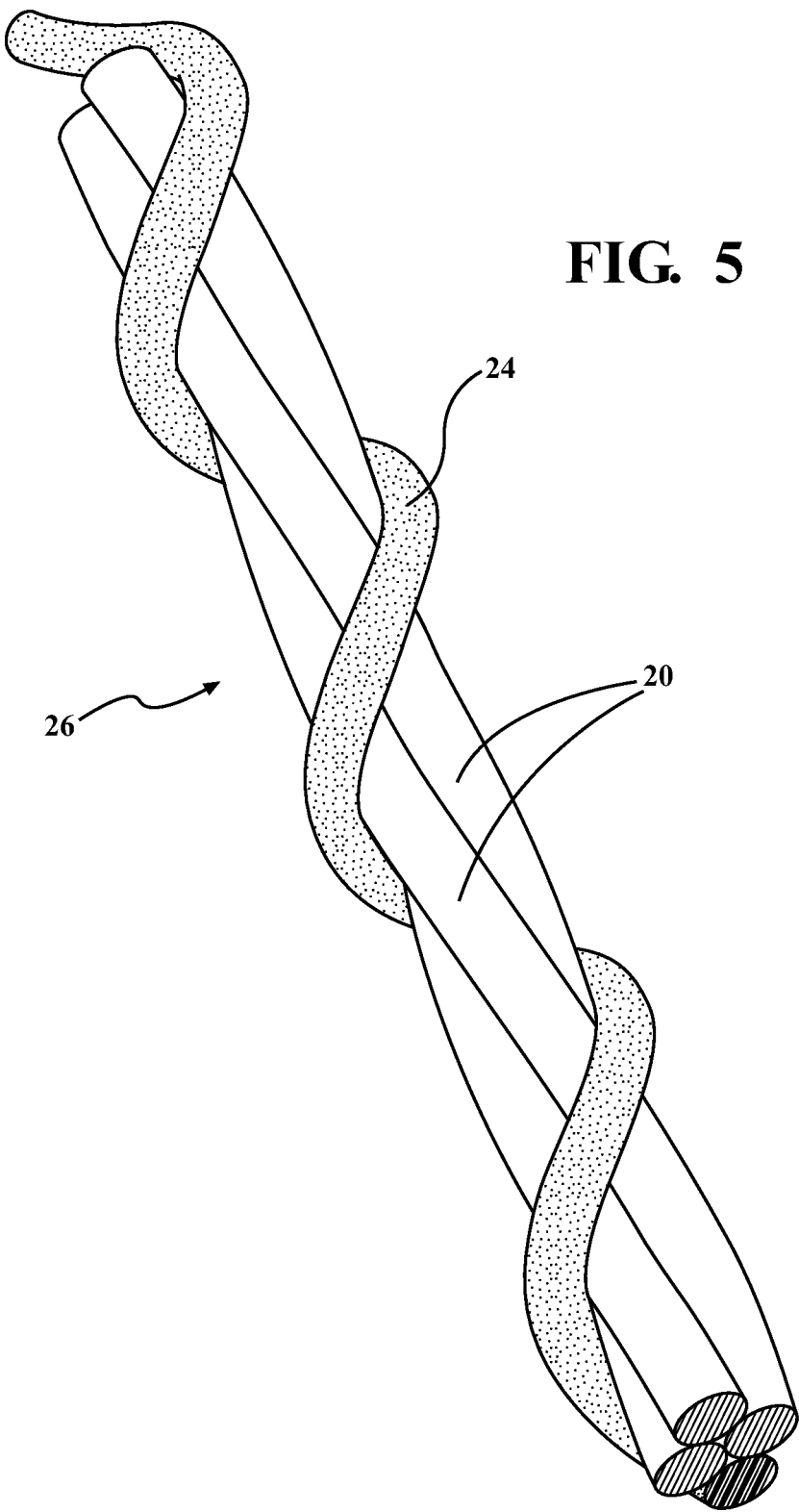
FIG. 5 is a partial cross-sectional perspective view of a commingled braid comprising three braided strands of monofilament reinforcing fiber, and one strand of monofilament binding fiber counter-wrapped helically about the three braided strands of reinforcing fiber.
Figure 12A:
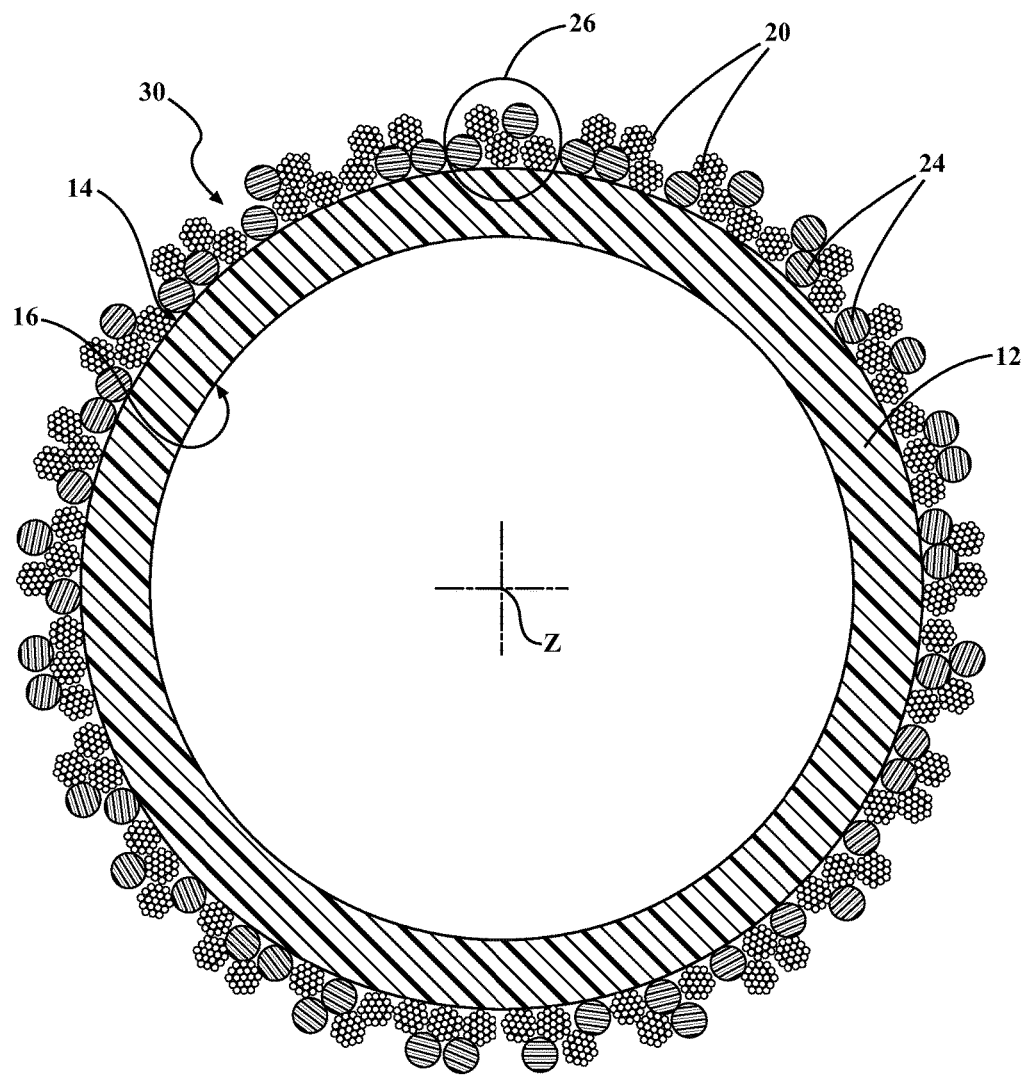
FIG. 12A is an end view of a reinforced tube comprising the commingled braid of FIG. 3 disposed about an outer peripheral surface of a tube.
Figure 12B:
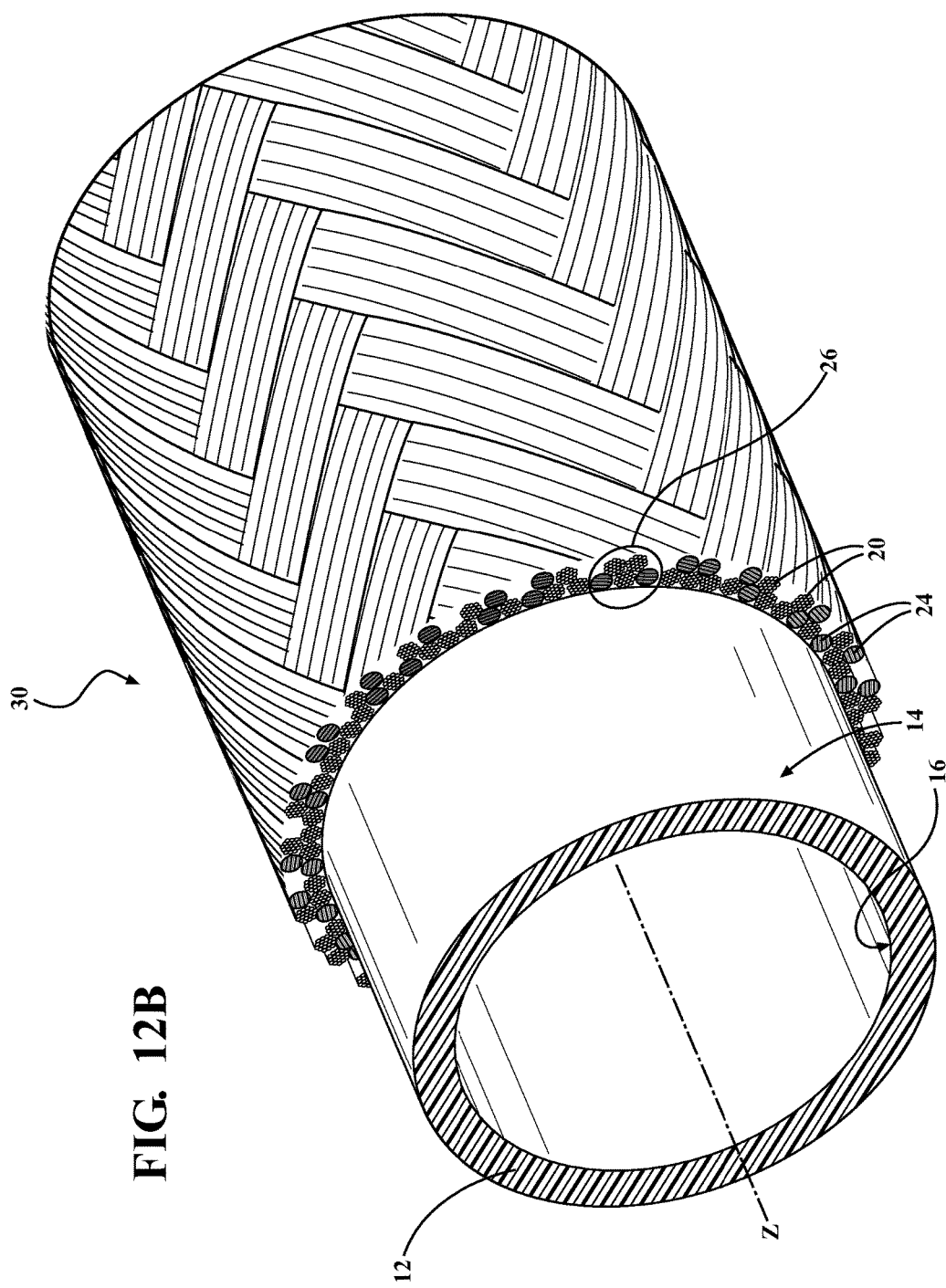
FIG. 12B is a partial cross-sectional perspective view of a reinforced tube comprising the commingled braid of FIG. 3 disposed about an outer peripheral surface of a tube.
Figure 12C:
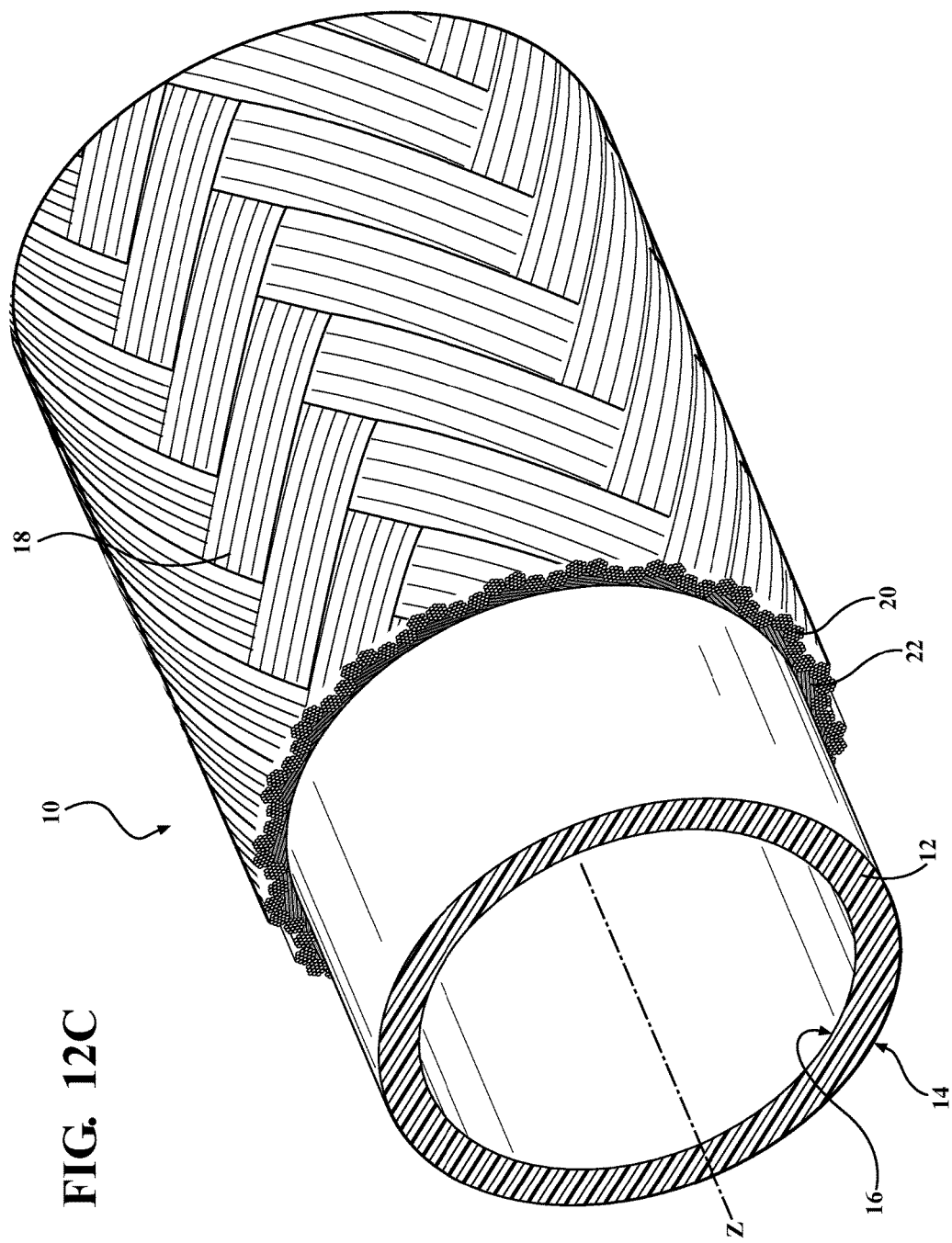
FIG. 12C is a partial cross-sectional perspective view of a hose assembly formed from the reinforced tube of FIGS. 12A and 12B.

Referring now to FIGS. 12A-12C, FIG. 12A is an end view of the reinforced tube 30 comprising the commingled braid 26 of FIG. 3 disposed about the outer peripheral surface 14 of the tube 12. FIG. 12B is a partial cross-sectional perspective view of the reinforced tube 30 comprising the commingled braid 26 of FIG. 3 disposed about the outer peripheral surface 14 of the tube 12. FIGS. 12A and 12B are prior to the steps of heating the reinforced tube 30 to a temperature ($T_1$) equal to or greater than a peak melting temperature of the binding fibers 24 to at least partially melt the binding fibers 24, and cooling the reinforced tube 30 to solidify the melted binding fibers 24 and form the hose assembly 10. FIG. 12C is a partial cross-sectional perspective view of the hose assembly 10 comprising the tube 12 and the reinforcing layer 18 disposed about the outer peripheral surface 14 of the tube 12 which is formed from the reinforced tube 30 of FIGS. 12A and 12B (after the steps of heating and cooling).

As set forth above, the method also includes the steps of heating the reinforced tube 30 to a temperature ($T_1$) equal to or greater than a peak melting temperature of the binding fibers 24 to at least partially melt the binding fibers 24, and cooling the reinforced tube 30 to solidify the melted binding fibers 24 and form the hose assembly 10. $T_1$ is typically equal to or greater than 190, alternatively equal to or greater than 220, alternatively equal to or greater than 250, alternatively equal to or greater than 280, alternatively equal to or greater than 310, alternatively equal to or greater than 340, alternatively equal to or greater than 370, alternatively equal to or greater than 400, ° C. The peak melting temperature of the binding fibers 24 is from 200 to 400, alternatively from 215 to 325, alternatively from 210 to 300, ° C. Typically, a softening temperature, a peak melting temperature, or a decomposition temperature of the reinforcing fibers 20 is at least 100° C. greater than the peak melting temperature of the binding fibers 24.

The method optionally includes the step of pressurizing an interior cavity of the tube 12 with a fluid such as water, an inert gas (e.g. nitrogen), or air, through an inlet and an outlet (each end of the reinforced tube 30) during the step of heating the reinforced tube 30. The cavity of the reinforced tube 30 is typically pressurized to a pressure of up to 500 (3447), alternatively from 5 to 100 (34.5 to 689.5), alternatively from 10 to 75 (68.9 to 517.1), alternatively from 20 to 60 (137.9 to 413.7), PSI (kPa). The step of pressurizing the reinforced tube 30 maintains the dimensional integrity of the tube 12 during the step of heating and also facilitates adhesion of the reinforcing layer 18 to the tube 12 because the pressure forces the fixed braid against the out peripheral surface of the tube 12.

The step of pressurizing can also create a temperature gradient/differential between the outer peripheral surface 14 of the tube 12 and the inner peripheral surface 16 of the tube 12 during the step of heating the reinforced tube 30. Of course, this temperature gradient typically decreases as process time increases, i.e., the temperature of the fluid gradually rises towards $T_1$. To this end, the fluid injected into the interior cavity of the reinforced tube 30 to pressurize the interior cavity of the reinforced tube 30 is typically injected at ambient temperatures but can be heated or cooled prior to injection. Nonetheless, the fluid typically has a temperature which is less than $T_1$. It is believed that this temperature gradient created by the step facilitates softening of the outer peripheral surface 14 of the tube 12 and thus improves the adhesion of the reinforcing layer 18 to the outer peripheral surface 14 of the tube 12 while maintaining the dimensional integrity of the internal cavity of the reinforced tube 30.

In one embodiment, the step of pressurizing is further defined as flowing or circulating inert gas through the interior cavity of the tube 12 while maintaining pressurization during the step of heating the reinforced tube 30. In this embodiment, the temperature differential between the outer peripheral surface 14 of the tube 12 and the inner peripheral surface 16 of the tube 12 can be maintained throughout the step of heating the reinforced tube 30. Said differently, the temperature gradient does not decrease as process time increases because the fluid is flowing through the interior cavity of the tube 12. The fluid which flows or circulates through the interior cavity of the tube 12 is typically at ambient temperatures, but can be heated or cooled. Nonetheless, in this embodiment, the fluid typically has a temperature which is less than $T_1$.

In one embodiment, the reinforced tube 30 is typically heated to a temperature ($T_1$) which is (1) equal to or greater than the onset melting temperature, but lower than the peak melting temperature, of the material of the outer peripheral surface 14 of the tube 12, and (2) greater than the peak melting temperature of the binding fibers 24 of the commingled braids 26. To this end, the peak melting temperature of the material of the outer peripheral surface 14 of the tube 12 is typically higher than the peak melting temperature of the binding fibers 24. Preferably, in this embodiment, the onset melting temperature of the material of the outer peripheral surface 14 of the tube 12 is at or near the peak melting temperature of the binding fibers 24. In this embodiment, the polymeric material, which defines the outer peripheral surface 14 of the tube 12, has a peak melting temperature up to 100° C. greater than, alternatively from 15 to 100° C. greater than the peak melting temperature of the binding fibers 24.

The onset and peak melting temperatures referred to throughout this disclosure are measured in accordance with ASTM D3418-12. ASTM D3418-12 is a standard test method for determining transition temperatures, enthalpies of fusion, and crystallization of polymers by differential scanning calorimetry ("DSC"). DSC measures both the onset melting temperature and the peak melting temperature. The onset melting temperature (also referred to as $T_o$) is the temperature at which the polymer begins to soften. The peak melting temperature (also referred to as $T_p$) is the temperature at which complete melting of the polymer occurs. The peak melting temperature as used herein, and as known in the art, can also be referred to as the melting point. The peak melting temperature is related to the enthalpy of thermal transition and is influenced by the polymer's crystallinity.

Figure 13A:
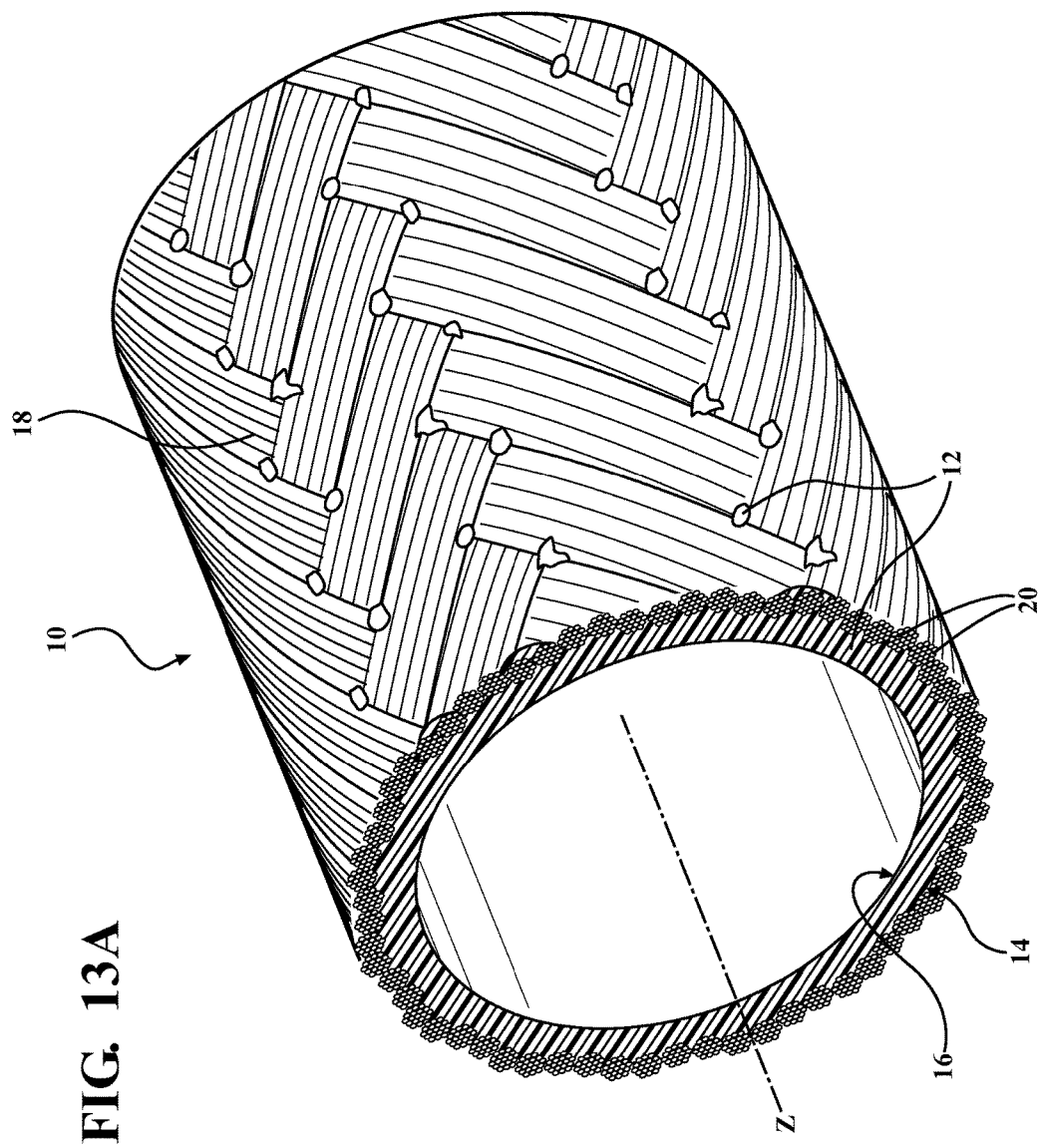
FIG. 13A is an end view of a hose assembly having a reinforcing layer and fibers thereof embedded in an outer peripheral surface of a tube.

In the embodiment of FIG. 13A, the reinforced tube 30 is typically heated to a temperature ($T_1$) which is (1) equal to or greater than the peak melting temperature of the material of the outer peripheral surface 14 of the tube 12 and (2) greater than the peak melting temperature of the binding fibers 24 of the commingled braid 26. To this end, the peak melting temperature of the material of the outer peripheral surface 14 of the tube 12 is about the same as (within 20° C. of) the peak melting temperature of the binding fibers 24. Preferably, the peak melting temperature of the material of the outer peripheral surface 14 of the tube 12 is at or near the peak melting temperature of the binding fibers 24. In this embodiment, the polymeric material which defines the outer peripheral surface 14 of the tube 12, has a peak melting temperature of within 100° C. of, alternatively within 50° C. of, alternatively within 20° C. of, the peak melting temperature of the binding fibers 24. Within as used herein is defined as within plus or minus the degrees specified, e.g. within 20° C. is defined as within plus 20° C. and minus 20° C. (for a total range of 40° C.). As is shown in FIG. 13A, during the step of heating, the reinforcing fibers 20 are embedded in the polymeric material of the outer peripheral surface 14 of the tube 12 and the polymeric material also flows into and seeps through the braid interstices of the reinforcing layer 18 thereby forming a robust bond between the tube 12 and the reinforcing layer 18.

Figure 13B:
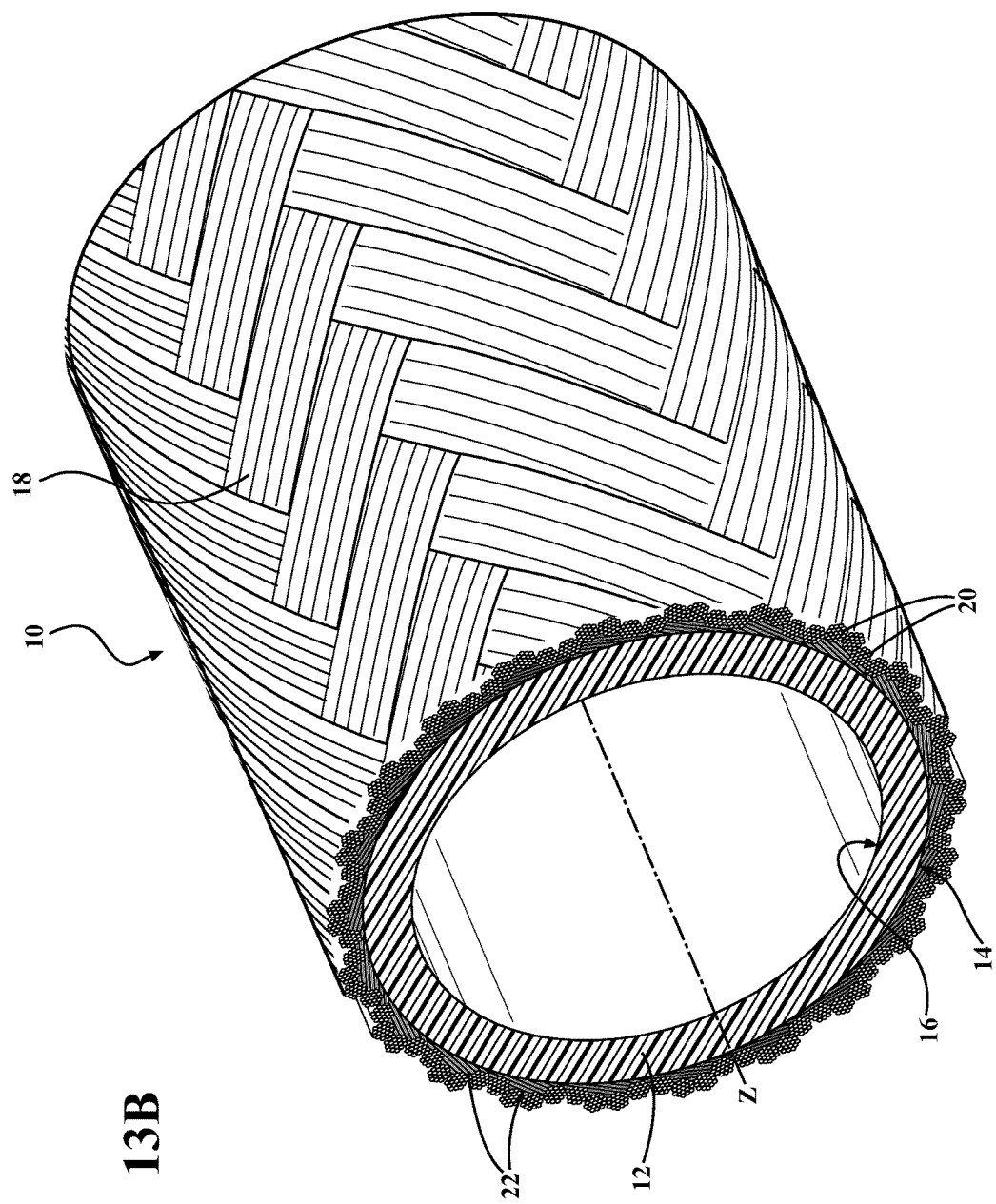
FIG. 13B is an end view of a hose assembly that does not have a reinforcing layer and the fibers thereof embedded in an outer peripheral surface of a tube.

In this embodiment, binding fibers 24 melt to form the binder 22 which is dispersed throughout the reinforcing fibers 20, between the strands of braided reinforcing yarn, and between the strands of braided reinforcing yarn and the outer peripheral surface 14 of the tube 12. As such, the binder 22 binds (1) the reinforcing fibers 20 within the reinforcing yarn together, (2) the strands of reinforcing yarn together, and (3) the braided reinforcing yarn to the outer peripheral surface 14 of the tube 12 thereby forming the hose assembly 10. During the step of heating the tube 12 having the commingled braid 26 applied thereto (the reinforced tube 30), a strong physical and/or chemical bond is formed between the outer peripheral surface 14 of the tube 12, and the reinforcing layer 18 (comprising the binder 22 and the reinforcing yarn). The hose assembly 10 of this embodiment is shown in FIG. 13A. FIG. 13A is an end view of the hose assembly 10 having the reinforcing layer 18 and the fibers thereof embedded in the outer peripheral surface 14 of the tube 12. In contrast, FIG. 13B is an end view of the hose assembly 10 that does not have the reinforcing layer 18 and the fibers thereof embedded in the outer peripheral surface 14 of the tube 12.

In this embodiment, the polymeric material, which defines the outer peripheral surface 14 of the tube 12, typically has a peak melting temperature up to 100° C. greater than the peak melting temperature of the binding fibers 24. In one embodiment, the tube 12 is a monolayer tube 12 and the outer peripheral surface 14 of the tube 12 has a peak melting temperature from 15 to 100° C. greater than a peak melting temperature of the binding fibers 24. In another embodiment, the tube 12 is a multilayer tube 12 and the outer peripheral surface 14 of the tube 12 has a peak melting temperature up to 20° C. greater than a peak melting temperature of the binding fibers 24.

In one such embodiment, the tube 12 is further defined as a multilayer tube 12 comprising an inner layer comprising a first polymeric material and an outer layer comprising a second polymeric material which defines the outer peripheral surface 14 of the multilayer tube 12. Of course, the first and second polymeric materials can be any of the polymeric materials in reference to the tube 12 described above. The first polymeric material has a peak melting temperature which is at least 15, alternatively at least 25, ° C. greater than a peak melting temperature of the second polymeric material wherein the second polymeric material softens before the first polymeric material during the step of heating the reinforced tube 30 to $T_1$. In this embodiment, the outer layer is at least partially melted which allows the reinforcing fibers 20 to imbed therein and the inner peripheral surface 16 of the multilayer tube 12 does not soften and thus maintains dimensional integrity. In this embodiment, the method may comprise the step of cross-linking the second polymeric material of the outer layer of the multilayer tube 12 of the hose assembly 10. In a preferred embodiment, the outer layer of the multilayer tube 12 of the hose assembly 10 is cross-linked with an electron beam.

When the hose assembly 10 is heated to a temperature such that the outer peripheral surface 14 of the tube 12 softens and the reinforcing layer 18 and the fibers thereof embedded in the outer peripheral surface 14 of the tube 12, the tube 12 that is electrically conductive is preferred. The electrically conductive tube 12 conducts heat more effectively and therefore facilitates the melting of the outer peripheral surface 14 of the tube 12 which, in turn, provides a robust bond between the tube 12 and the reinforcing layer 18. Typically, there is about a 38° C. difference in localized temperature at the outer peripheral surface 14 of the tube 12 between the tube 12 that is conductive and the tube 12 that is non-conductive (assuming the oven set temperatures are the same). As such, in various embodiments of the method, the conductive tube 12 is used. In one embodiment, a conductive PTFE tube 12 is used. In another embodiment, the tube 12 comprising a conductive PTFE inner layer and a non-conductive PTFE outer layer is used.

The hose assembly 10 of the subject disclosure, including the embodiments of the previous three paragraphs, exhibits an excellent bond between the outer peripheral surface 14 of the tube 12 and the reinforcing layer 18. That is, the bond is typically so strong that the reinforcing layer 18 cannot be separated or delaminated from the tube 12 without destroying the hose assembly 10. Without being bound by theory, it is believed that the strength of this bond is the result of both physical adhesion and chemical interaction (ionic and/or covalent) between the polymers of the tube 12 and the polymer of the binding fibers 24 achieved with the subject method.

The step of heating the tube 12 having the commingled braids 26 applied thereto typically involves heating the exterior of the tube 12 in order to soften or melt the binding fibers 24 of the braid and bond the reinforcing fibers 20 of the comingled braid 26 to the outer peripheral surface 14 of the tube 12. In the case of a monolayer tube 12, this is accomplished by the temperature ($T_1$) not exceeding the peak melting temperature of the tube 12, but rather only to the onset melting temperature of the tube 12. Of course, a multilayered tube 12 having an outer layer with a lower peak melting temperature than the peak melting temperature of an inner layer can be heated to a temperature equal to or greater than the peak melting temperature of the outer layer but less than the peak melting temperature of the inner layer. As such, the inner layer maintains dimensional integrity but the outer layer softens. In this embodiment, the inner peripheral surface 16 of the tube 12 maintains its integrity, but the outer peripheral surface 14 of the tube 12 softens so that the reinforcing layer 18 can embed in the outer peripheral surface 14 of the tube 12 to facilitate an excellent bond between the tube 12 and the reinforcing layer 18.

During the step of heating the tube 12 having the commingled braids applied thereto the reinforcing yarn of the commingled braid 26 typically functions as an insulator and inhibits the transfer of heat from an exterior to an interior of the hose assembly 10. More specifically, the reinforcing yarn propagates a temperature gradient between the exterior of the hose assembly 10, the outer peripheral surface 14 of the tube 12, and the inner peripheral surface 16 of the tube 12. The magnitude of temperature gradient depends on various factors, such as the composition of the reinforcing fibers 20 (e.g. glass) and the binding fibers 24 (e.g. polyamide), a ratio of the reinforcing fibers 20 to the binding fibers 24, the dimensions (e.g., diameter) of the reinforcing fibers 20 and the binding fibers 24, the total number of the reinforcing fibers 20 and the binding fibers 24; and the configuration of the commingled braid 26 (e.g. the binding fibers 24 wound within the commingled braid 26, around the commingled braid 26, etc. as illustrated in the Figures), etc.

The method optionally includes the step of cross-linking the polymeric material of the outer peripheral surface 14 of the tube 12 of the hose assembly 10. The polymeric material of the outer peripheral surface 14 of the tube 12 (e.g. the second polymeric material) can be cross-linked with heat, ultraviolent radiation (UV), electron beam, and combinations thereof. The step of cross-linking is typically conducted subsequent to the step of heating the reinforced tube 30. If the step cross-linking is conducted prior to the step of heating the reinforced multilayer tube 30 the second polymeric material will not flow well into the braid interstices. In a preferred embodiment, the polymeric material of the outer peripheral surface 14 of the tube 12 of the hose assembly 10 is cross-linked with an electron beam. The physical properties of other polymeric materials of the tube 12, e.g. the first polymeric material and any intermediate layers within the tube, should not be degraded during the step of cross-linking (e.g. with the electron beam). As such, the other polymeric materials of the tube 12 must be selected appropriately. In various embodiments, the other polymeric materials can be cross-linked for improved properties and also to prevent degradation of physical properties when the polymeric material of the outer peripheral surface 14 of the tube 12 is cross-linked.

After the step of heating, the hose assembly 10 is typically cooled to control physical properties of the tube 12 by controlling the crystallinity of the polymeric material (binder 22 and tube 12 materials) and to maintain the inner diameter and the outer diameter of the tube 12.

In one embodiment, the binding fibers 24 comprise a fluoropolymer selected from the group of polytetrafluoroethylene, fluorinated ethylene propylene, perfluoroalkoxy, and ethylenetetrafluoroethylene, and the polymeric material defining the outer peripheral surface 14 of the tube 12 comprises a fluoropolymer. In this embodiment, the fluoropolymer binding fibers 24 melt to form a binder 22 which is compatible with, and exhibits robust adhesion to, the fluoropolymer tube 12.

In another embodiment, the binding fibers 24 comprise a polyamide selected from the group of PA11, PA12, PA610, PA612, PA1010, PA6, PA66, PA1110T, and PA1212T, and the polymeric material defining the outer peripheral surface 14 of the tube 12 comprises a polyamide. In this embodiment, the polyamide binding fibers 24 melt to form a binder 22 which is compatible with, and exhibits robust adhesion to, the polyamide tube 12.

In yet another embodiment, the hose assembly 10 is formed from a tube 12 comprising Dupont™ PTFE® 62 PTFE having an onset melting temperature of 280° C. and a peak melting temperature of 322° C. and the commingled braid 26 including the reinforcing yarn comprising glass and the binding fibers 24 comprising PFA having a peak melting temperature of 305° C. In this embodiment, the outer peripheral surface 14 of the tube 12 having the commingled braid 26 applied thereto is heated to a temperature of from 290 to 305° C. such that the binding fibers 24 melt and adhere to the softened PTFE of the outer peripheral surface 14 of the tube 12 to form the hose assembly 10 comprising the tube 12 and the reinforcing layer 18 bound thereto.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present disclosure has been described in an illustrative manner, and it is to be understood that the terminology which has been used is intended to be in the nature of words of description rather than of limitation. Many modifications and variations of the present disclosure are possible in light of the above teachings. It is, therefore, to be understood that within the scope of the appended claims, the present disclosure may be practiced otherwise than as specifically described.

What is claimed is:

1. A method of forming a hose assembly, the hose assembly comprising a tube formed from a polymeric material and defining an outer peripheral surface, and a reinforcing layer disposed about the outer peripheral surface of the tube, the reinforcing layer comprising reinforcing fibers and a binder formed from binding fibers, said method comprising the steps of:
    extruding the tube wherein the polymeric material defines the outer peripheral surface of the tube and comprises a fluoropolymer;
    forming a commingled braid from the reinforcing fibers and the binding fibers, said binding fibers consisting essentially of a fluoropolymer selected from the group of polytetrafluoroethylene, fluorinated ethylene propylene, perfluoroalkoxy, and ethylenetetrafluoroethylene, the binding fibers having a peak melting temperature of from 200 to 400° C.;
    disposing the commingled braid about the outer peripheral surface of the tube to form a reinforced tube;
    heating the reinforced tube to a temperature ($T_1$) equal to or greater than the peak melting temperature of the binding fibers to at least partially melt the binding fibers;
    pressurizing an interior cavity of the tube with a fluid during the step of heating the reinforced tube; and
    cooling the reinforced tube to solidify the melted binding fibers to form the binder about the reinforcing fibers, thereby forming a reinforced braid and binding the reinforced braid to the outer peripheral surface of the tube to form the reinforcing layer.

2. The method as set forth in claim 1 wherein a softening temperature, a melting temperature, or a decomposition temperature of the reinforcing fibers is at least 100° C. greater than the peak melting temperature of the binding fibers.

3. The method as set forth in claim 1 wherein the reinforcing fibers comprise glass or ceramic fibers and has a softening temperature of at least 100° C. greater than the peak melting temperature of the binding fibers.

4. The method as set forth in claim 1 wherein the reinforcing fibers comprise polyamide and has a peak melting temperature of at least 100° C. greater than the peak melting temperature of the binding fibers.

5. The method as set forth in claim 1 wherein the polymeric material, which defines the outer peripheral surface of the tube, has a peak melting temperature up to 100° C. greater than the peak melting temperature of the binding fibers.

6. The method as set forth in claim 1 wherein the tube is a monolayer tube and the outer peripheral surface of the tube has a peak melting temperature of from 15 to 100° C. greater than the peak melting temperature of the binding fibers.

7. The method as set forth in claim 1 wherein the tube is a multilayer tube and the outer peripheral surface of the tube has a peak melting temperature within 100° C. of the peak melting temperature of the binding fibers.

8. The method as set forth in claim 1 wherein $T_1$ of the step of heating is greater than the onset melting temperature, but lower than the peak melting temperature, of the polymeric material of the tube.

9. The method as set forth in claim 1 wherein the step of disposing the commingled braid about the outer peripheral surface of the tube to form the reinforced tube is further defined as braiding the commingled braid about the outer peripheral surface of the tube.

10. The method as set forth in claim 1 wherein the step of forming a commingled braid from the reinforcing fibers and the binding fibers is further defined as braiding the reinforcing fibers and the binding fibers to form the commingled braid.

11. The method as set forth in claim 1 wherein the step of disposing the commingled braid about the outer peripheral surface of the tube to form the reinforced tube is further defined as disposing a commingled braid that comprises from 55 to 95 percent by volume reinforcing fibers and from 5 to 45 percent by volume binding fibers about the outer peripheral surface of the tube.

12. The method as set forth in claim 1 wherein the tube is further defined as a multilayer tube comprising an inner layer comprising a first polymeric material and an outer layer comprising a second polymeric material which defines the outer peripheral surface of the multilayer tube and wherein the first polymeric material has a peak melting temperature which is greater than a peak melting temperature of the second polymeric material.

13. The method as set forth in claim 12 further comprising the step of cross-linking the second polymeric material of the outer layer of the multilayer tube of the hose assembly.

14. The method as set forth in claim 1 further comprising the step of disposing a silicone layer about the reinforcing layer.

* * * * *